United States Patent
Tsypliaev et al.

(10) Patent No.: US 9,213,698 B1
(45) Date of Patent: Dec. 15, 2015

(54) UNIFIED DATA ARCHITECTURE FOR BUSINESS PROCESS MANAGEMENT AND DATA MODELING

(71) Applicant: Comindware Ltd., Tortola (VG)

(72) Inventors: Maxim V. Tsypliaev, Moscow (RU); Peter E. Volynskiy, Moscow (RU)

(73) Assignee: Comindware Ltd., Tortola (VG)

( * ) Notice: Subject to any disclaimer, the term of this patent is extended or adjusted under 35 U.S.C. 154(b) by 81 days.

(21) Appl. No.: 13/932,597

(22) Filed: Jul. 1, 2013

Related U.S. Application Data

(63) Continuation-in-part of application No. 13/019,319, filed on Feb. 2, 2011, now Pat. No. 8,478,766.

(51) Int. Cl.
*G06F 17/30* (2006.01)
*G06F 17/22* (2006.01)

(52) U.S. Cl.
CPC ............ *G06F 17/30* (2013.01); *G06F 17/2276* (2013.01); *G06F 17/3056* (2013.01); *G06F 17/30327* (2013.01); *G06F 17/30557* (2013.01); *G06F 17/30575* (2013.01)

(58) Field of Classification Search
CPC ........... G06F 17/30; G06F 17/00; G06F 9/44; G06F 17/30398; G06F 17/30392; G06F 17/30997; G06F 17/30557; G06F 17/3056; G06F 17/30327; G06F 17/30575; G06F 17/2276; Y10S 707/99934; Y10S 707/99943
USPC ......... 707/751, 754, 756, 760, 768, 777, 792, 707/796–798, 803–805, 810; 715/239; 717/123, 104, 106, 108, 110
See application file for complete search history.

(56) References Cited

U.S. PATENT DOCUMENTS 6,640,231 B1 * 10/2003 Andersen et al. ..................... 1/1
6,850,922 B1 * 2/2005 Wason ............................ 706/47

(Continued)

FOREIGN PATENT DOCUMENTS

WO WO 2006/020343 * 2/2006

OTHER PUBLICATIONS

Vincent Dedeban, "Ontology-driven and rules-based system for management and pricing of family of product", Norwegian University of Science and Technology Department of Computer and Information Science, Jun. 2007.pp. 1-124.*

*Primary Examiner* — Srirama Channavajjala
(74) *Attorney, Agent, or Firm* — Bardmesser Law Group

(57) ABSTRACT

A computer-implemented method of processing business data, the method including storing data in SPO (subject-predicate-object) format in multiple databases; using a storage layer to connect to the multiple databases and maintaining a record of which data is stored in which database, the data comprising rules and axioms, the axioms representing user data; the rules and the axioms stored in the SPO format; at least one ontology representing a union of at least some rules and axioms that represent a particular data interpretation; a storage layer that permits working with data stored in different databases simultaneously and permits a user to use data from several storages simultaneously; transforming the user data based on context provided by a business application that works with specific objects and ontologies, the context being defined by a particular ontology; performing operations on the data based on triggers specified by the rules; generating new data in the same context; processing requests from a business layer to transform the data; and presenting the data to the user based on the context.

20 Claims, 18 Drawing Sheets

(56) References Cited

U.S. PATENT DOCUMENTS

| | | |
|---|---|---|
| 7,233,934 B1 * | 6/2007 | Oggerino et al. .............. 706/47 |
| 2003/0149934 A1 * | 8/2003 | Worden ....................... 715/513 |
| 2003/0236785 A1 * | 12/2003 | Shintani et al. ................. 707/6 |
| 2004/0249819 A1 * | 12/2004 | Matsumoto et al. ............ 707/10 |
| 2005/0021533 A1 * | 1/2005 | Ayachitula et al. .......... 707/100 |
| 2007/0106520 A1 * | 5/2007 | Akkiraju et al. .................. 705/1 |
| 2008/0077598 A1 * | 3/2008 | Wilmering et al. ........... 707/100 |
| 2008/0288235 A1 * | 11/2008 | Dettinger et al. ............... 703/23 |
| 2008/0295068 A1 * | 11/2008 | Kendall et al. ................ 717/104 |
| 2009/0171903 A1 * | 7/2009 | Lin et al. ......................... 707/3 |
| 2010/0185700 A1 * | 7/2010 | Bodain ........................ 707/803 |
| 2012/0005655 A1 * | 1/2012 | Roy et al. ..................... 717/123 |

\* cited by examiner

UNIFIED DATA ARCHITECTURE FOR BUSINESS PROCESS MANAGEMENT AND DATA MODELING

CROSS-REFERENCE TO RELATED APPLICATIONS

This application is a continuation in part of U.S. patent application Ser. No. 13/019,319, filed on Feb. 2, 2011 (now U.S. Pat. No. 8,478,766), incorporated by reference herein in its entirety.

BACKGROUND OF THE INVENTION

1. Field of the Invention

The present invention is related to business process management, and more particularly, to a unified architecture and a common syntactical framework for representing context of business process data, and management and tracking of the business processes.

2. Description of the Related Art

Business process management is an increasingly popular area of research and current software development. To date, there is no unified mechanism for a convenient representation of business processes data and data context. Typically, most software vendors provide one piece of the "puzzle", such as CRM (customer relationship management), invoice tracking, order tracking, Gantt chart software, and so on. Many of the vendors in this area are relatively small companies, and typically the software product grows out of their own initial need to solve a particular problem, and the product is often tied to a particular world view of the vendor.

For a typical business enterprise, it is necessary to buy and integrate several pieces of software—for example, project management software typically does not "talk" to accounting software. Customer relationship management software does not talk to parts ordering software, and so on. Additionally, most such software packages have very limited ability to alter or change the way the data is presented to the user. Frequently, a relational database is used as part of the engine, with the attendant limited ability to manually add fields to the database. However, for most end users, the need to change the "candid" data representations represents a substantial difficulty, and often requires hiring consultants or additional IT staff.

The semantic web, see FIG. 1, comprises the standards and tools of XML, XML Schema, RDF, RDF Schema and OWL that are organized in the Semantic Web Stack. The OWL Web Ontology Language Overview describes the function and relationship of each of these components of the semantic web stack XML provides an elemental syntax for content structure within documents, yet associates no semantics with the meaning of the content contained within.

XML Schema is a language for providing and restricting the structure and content of elements contained within XML documents.

RDF is a simple language for expressing data models, which refer to objects ("resources") and their relationships. An RDF-based model can be represented in XML syntax.

RDF Schema extends RDF and is a vocabulary for describing properties and classes of RDF-based resources, with semantics for generalized-hierarchies of such properties and classes.

OWL (see FIG. 2) illustrates additional vocabulary for describing properties and classes: among others, relations between classes (e.g. disjointness), cardinality (e.g. "exactly one"), equality, richer typing of properties, characteristics of properties (e.g., symmetry), and enumerated classes.

Accordingly, what is needed is a unified architecture that permits a business enterprise to easily represent the context for business analysis in business processes that occur within the enterprise, and to provide an easy interaction mechanism between users representing various aspects of the business, and the data stored within the business model.

SUMMARY OF THE INVENTION

The present invention is intended as a method and system for modeling business processes that substantially obviates one or several of the disadvantages of the related art.

In one aspect of the invention, there is provided a computer-implemented method of processing business data, the method including specifying a plurality of axioms representing facts and relationships between the facts, the axioms written in subject-predicate-object triplet format; specifying a plurality of rules for processing the axioms. Some of the rules are compiled to generate an engine for processing at least some of the axioms. A request to the engine is generated, for presenting data to a user. Additional rules needed to respond to the request are compiled and added to the engine, without re-compiling previously compiled rules. The data is processed and presented to the user.

In another aspect, there is provided a computer-implemented method of processing and presenting business data, including storing data in SPO (subject-predicate-object) format in multiple databases; using a storage layer to connect to the multiple databases and maintaining a record of which data is stored in which database, the data comprising rules and axioms, the axioms representing user data; the rules and the axioms stored in the SPO format; at least one ontology representing a union of at least some rules and axioms that represent a particular data interpretation; a storage layer that permits working with data stored in different databases simultaneously and permits a user to use data from several storages simultaneously; transforming the user data based on context provided by a business application that works with specific objects and ontologies, the context being defined by a particular ontology; performing operations, such as, for example, conjunction and disjunction, on the data based on triggers specified by the rules; generating new data in the same context; and processing requests from a business layer to transform the data; and presenting the data to the user based on the context.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

In the drawings:

FIG. 1 illustrates the semantic web stack.

FIG. 2. illustrates a portion of the semantic web, that includes the family of descriptive languages, including XML, XML Schema, RDF, RDF Schema, OWL.

DETAILED DESCRIPTION OF THE PREFERRED EMBODIMENTS

Reference will now be made in detail to the preferred embodiments of the present invention, examples of which are illustrated in the accompanying drawings.

The following are two examples of representing RDF graphs—in XML format (which is frequently more convenient for computer-based processing) and in the form of N-triplets, or N3 (which is used in the present approach, and which is more convenient for human understanding).

XML syntax:
<?xml version="1.0"?>
<rdf:RDF
xmlns:rdf="http://www.w3.org/1999/02/22-rdf-syntax-ns#"
xmlns:dc="http://purl.org/dc/elements/1.1/"
xmlns:exterms="http://www.example.org/terms/">
<rdf:Description rdf:about="http://www.example.org/index.html">
<exterms:creation-date>August 16, 1999</exterms:creation-date>
</rdf:Description>
<rdf:Description rdf:about="http://www.example.org/index.html">
<dc:language>en</dc:language>
</rdf:Description>
</rdf:RDF>

N3 syntax would be as follows:
<ex:index.html> <dc:creator> exstaff:85740.
<ex:index.html> <exterms:creation-date> "August 16, 1999".
<ex:index.html> <dc:language> "en".

Thus, the XML syntax is far more verbose than the N3 syntax, but, it is much easier for computers to process.

Figure 1:
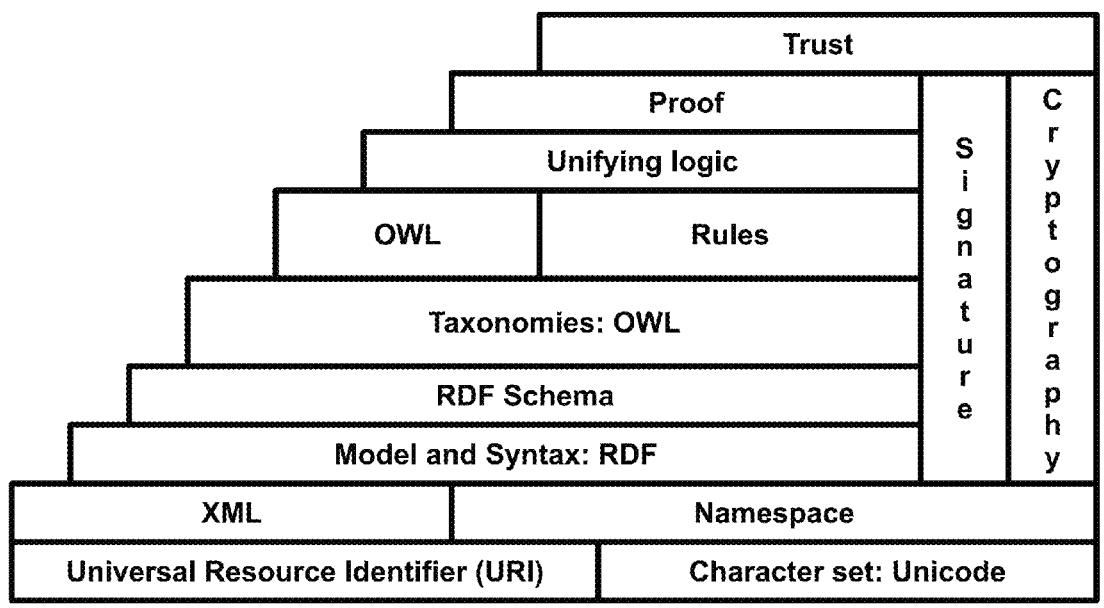
Figure 2:
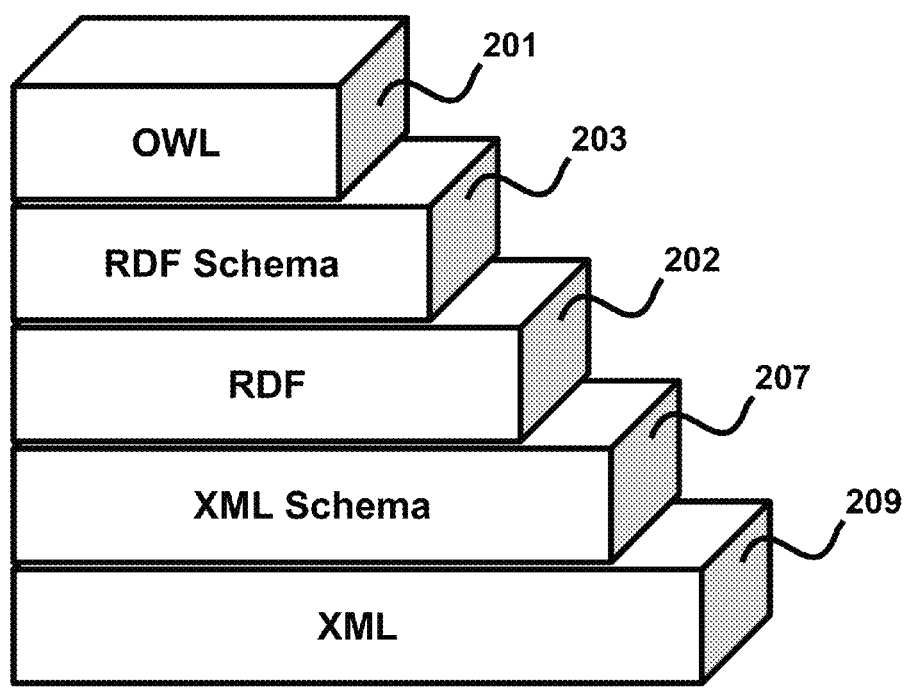
Figure 3:
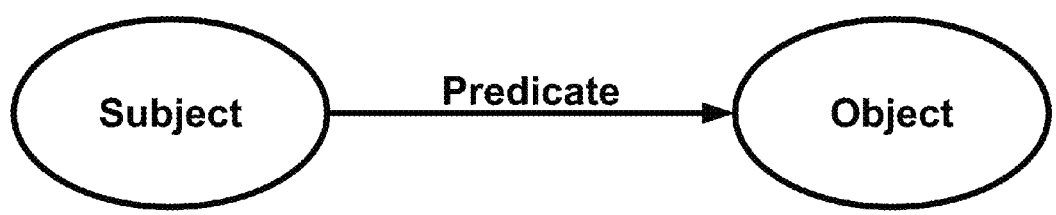
FIG. 3 illustrates an RDF triplet graph.

The basic unit of an RDF is a collection of triplets, each of which consists of a subject, a predicate, and an object (SPO). The set of triplets is commonly referred to as an RDF graph, an example of which is shown in FIG. 3. The direction of the arrow in any given triplet shows in such that the arrow points from the subject to the object. (http:**en.wikipedia.org/wiki/Resource_Description_Framework) The subject of an RDF statement is either a Uniform Resource Identifier (URI) or a blank node, both of which denote resources. Resources indicated by blank nodes are called anonymous resources. They are not directly identifiable from the RDF statement. The predicate is a URI which also indicates a resource, representing a relationship. The object is a URI, blank node or a Unicode string literal.) The triplet approach is one that will be utilized in the present application to process information from various sources.

Figure 4:
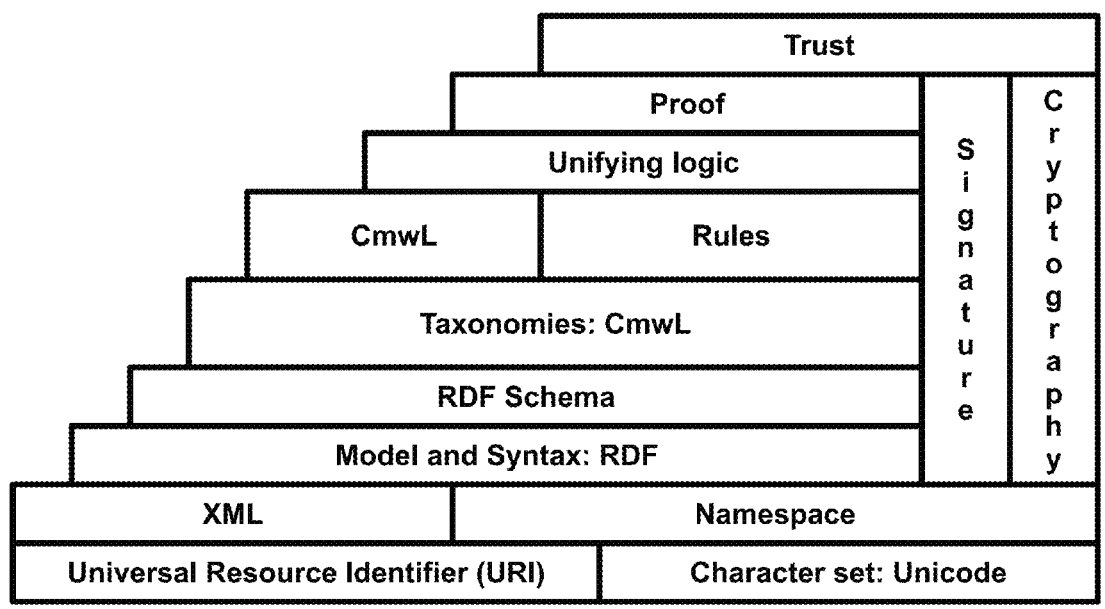
FIG. 4 illustrates the application of semantic web concepts to the data architecture described herein.
Figure 5:
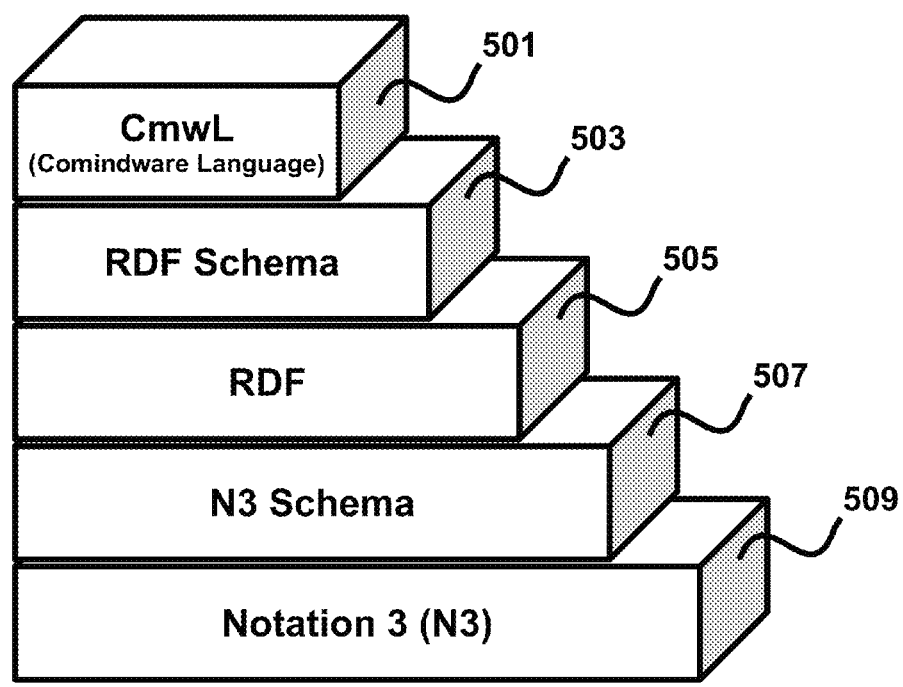
FIG. 5 illustrates a portion of the semantic web, that uses the Comindware language.

As shown in FIG. 4, there is a rough semantic correspondence between the semantic web stack (shown on the left) and the semantic stack of the present application, shown on the right. As shown in FIG. 4, the semantic stack utilized in the present application includes the CmwL (Comindware Language) 401, the RDF schema 403, the RDF 405, the N3 schema 407, and the notation N3. The main idea here is that OWL is replaced by a special language—Comindware (after the assignee of this application)—which represents a limited version of OWL, in order to improve performance and get rid of functionality and operations which is unnecessary for the purposes of modeling business processes (but using OWL vocabulary and some of its rules).

The following OWL concepts are used for user templates (see http:**www.w3.org/TR/owl-ref/):
3.1 Class descriptions
3.1.1 Enumeration
3.1.2.2 Cardinality constraints
3.1.3.2 owl:unionOf
3.2.1 rdfs:subClassOf
4.1 RDF Schema constructs
RDF Datatypes
Extended Features:
+User template ontology
+Enumeration type ontology
+Calculated property ontology
+Security ontology
System ontologies to be described in OWL:
+Query ontology,
+Restriction ontology
+Workflow ontology
+User account ontology,
+UI ontologies
+Misc ontologies (e-mail, history, attachment, etc.)

Thanks to the use of the RDF (resource definition framework), it is possible to work with different data sources (databases, data storages, which can be local, on a corporate network, or located on the Internet). It is possible to utilize a common dictionary URI, thereby permitting to integrate data from different servers. It is also possible, based on the data and the rules, to provide on-the-fly representation of the data (rather than static slices, as is done with OLAP cubes).

By way of examples of data sources that can be represented in this matter, a database (or some other type of storage) server that serves the Human Resources department can score data regarding a new employee. The same data can be used by the IT department to add the user to the corporate network. Also, the same data can be used by the accounting department to implement payments of the employees' salary. Note that the servers can be both local (on the corporate network) or remote, for example, accessible over a wide area network, or the internet. Note also that if one of the servers is offline, this will not affect correctness of the data. For example, if the IT department's server is offline at the moment that a new employee is added by the HR department, once the IT server is back online, thanks to RD, the same person will be reflected in both business applications. The email shown in the figure is needed not just to notify the other department that a new employee has been added, but to synchronize the terminology. For instance, to the HR department, a person is an employee, to the IT department he is a a user, to the accounting department, he is a payee. With the help of RDF, the global database can reflect that global:person=HR: employee=IT:user, and then everything will be synchronized with no further efforts by anyone.

Also, the data can be taken from a webpage or, for example, from any source identified by a URI. With the help of "data converters" any information described by RDF can be used, for example, the rules can say "something" from a "source" is source: something—is cmw:"our thing" http:**www.w3.org/2000/10/swap/doc/Reach)

Further, by way of example, consider a company that has threebusiness applications—one for HR (human resources management system), one for ACC (accounting system) and one for IT (information technology—Helpdesk). Therefore, each business application can have its own server. When any employee begins work, the human resources "creates" a new employee, specifying the first name, last name, position. Then, either manually or automatically, this information is sent to the accounting department and to the IT department.

The accounting department creates an employee with attributes that are relevant to his employment—salary, type of compensation, such as hourly, monthly, etc., social security number, etc. The IT department creates a user account with the attributes that are relevant to the IT department—such as rights to access internal company resources, the hardware/computer given to the employee, license fees for the software on the employee's computer, etc. These three departments have their corresponding applications, which are shown in FIG. 7, illustrating the HR department and application 701, the accounting department and application 703, and the IT department and application 705. The global can be imagined as Engine, which presents contextualized data to the particular business application, 707, that is why it can aggregate all the information from all the business applications, and generates a contextualized information relating to the employee (as well as to other employees). On the left of FIG. 6 (to the left of the Storage Layer) is the pool of information which can be stored in different databases or other storages. 707 is the element that permits presenting contextualized business information for a particular application. "Global" is an entity for a representation of the data in a particular context of a business application.

Context can be thought of as an environment surrounding a particular event, object or individual that defines the interpretation of data and actions/operations on the data in a particular situation. Optionally, the context defines the method of processing the data in a particular situation. For example, someone's email address can be treated as a login information in one context, and as a contact information in user's profile, in another context, and as a requestor in a support ticket, in a third context—all depending on interpretation of the data.

The exchange of information between the servers is done automatically, since all the servers use a common dictionary. For example: http://<company_name>.com/tracker/ontology/global/hr, or http://<company_name>.com/tracker/ontology/global/it or http://<company_name>.com/tracker/ontology/global/acc, all are conjoined into http://<company_name>.com/tracker/ontology/global).

Even in the case where the accounting department, when creating an employee record manually, uses its own dictionary, it is possible to write a rule {ACC:person is Global: employee}, thereby providing a translation mechanism between the accounting department's dictionary and the global dictionary.

From this example, it is clear that the proposed architecture permits each individual group or department within a business to work with its own database/storage and its own server system, while the global server with engine 707 can presenta combined view of all the data from all the departments. This is done on-the-fly, and without duplicating the data, which is particularly important from the perspective of information security, as well as from a point of view of maintaining up to date information (in this case, when the data on one storage changes, there is no need to change the data on other storages). global:person+rule description for "receiving a person" from the local business applications is the ontology for Person in the Global database. Thus, one option is using a different ontology for each business application, while another option is the use of a common ontology for all applications.

Figure 6:
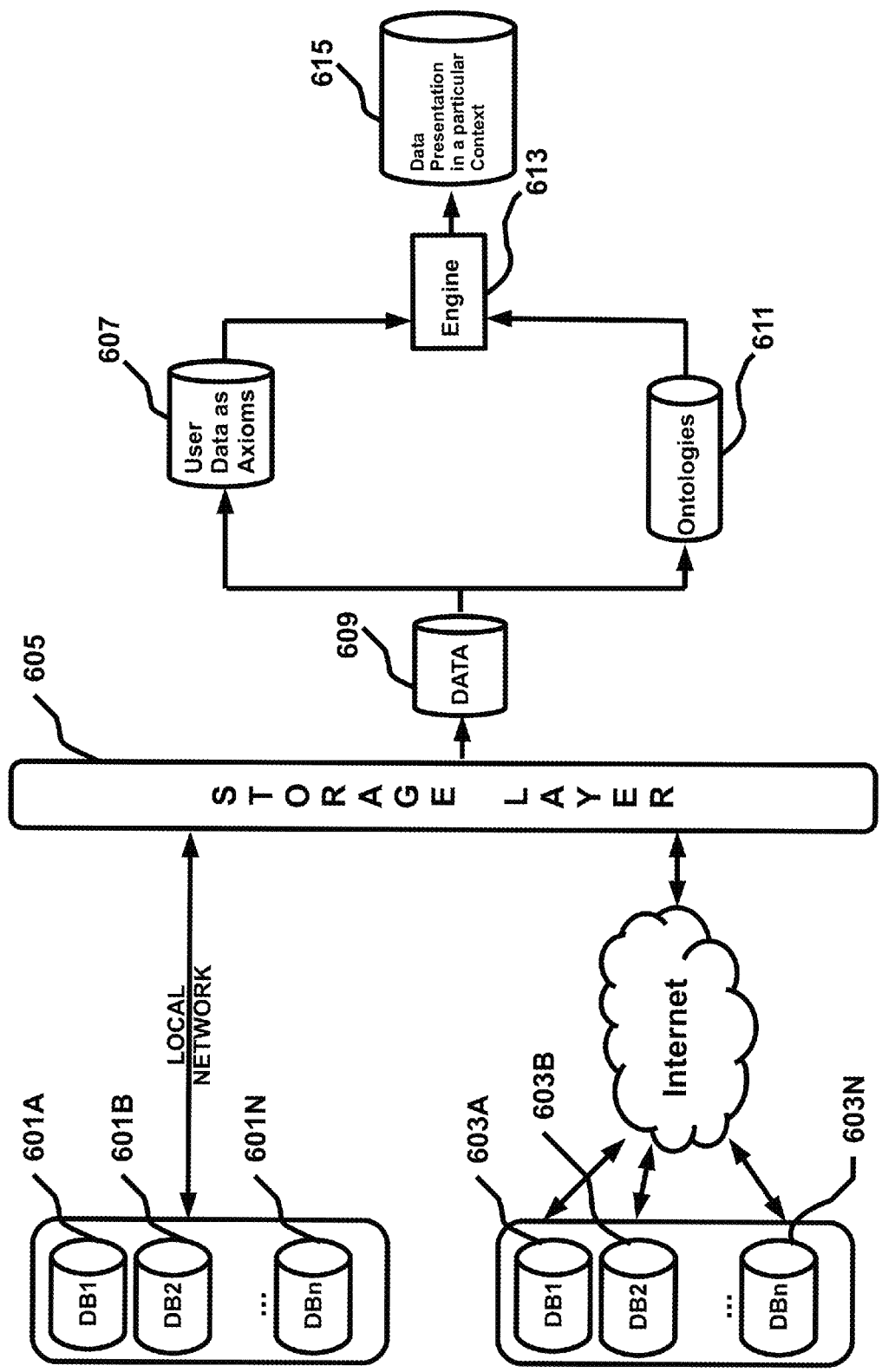
FIG. 6 illustrates an exemplary system architecture.
Figure 7:
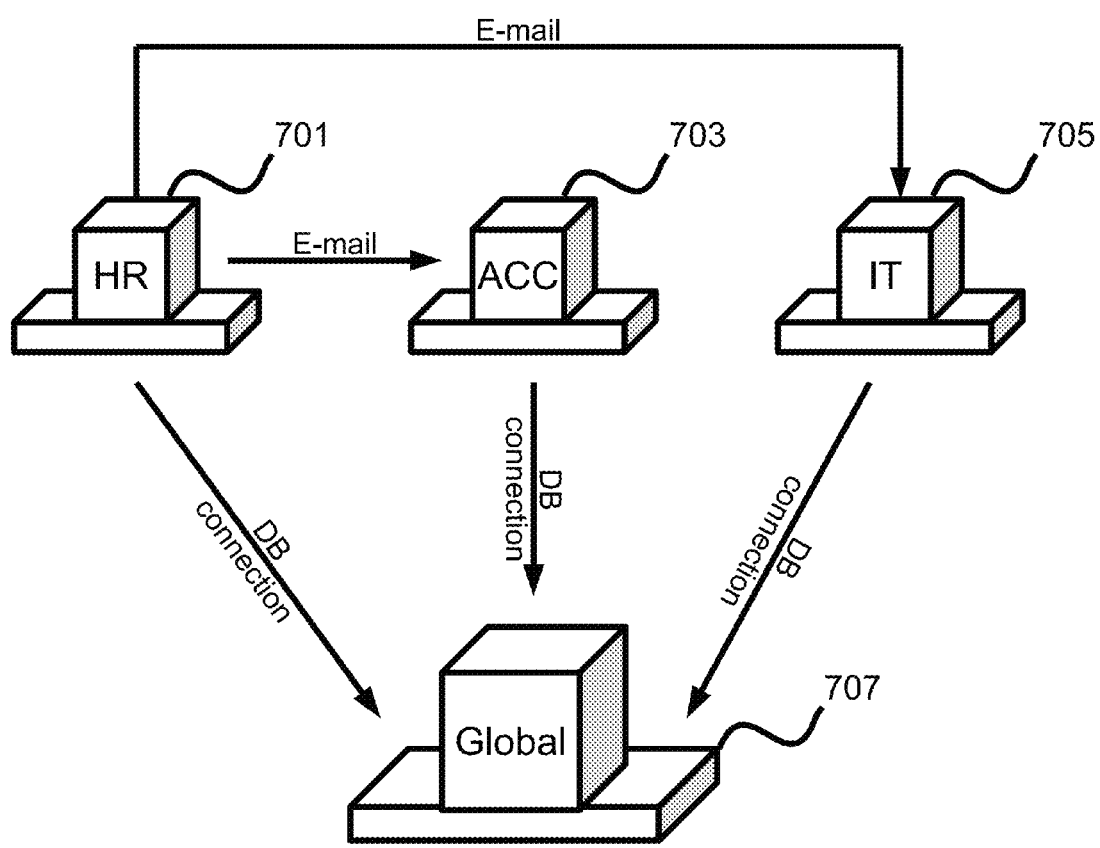
FIG. 7 illustrates an example of different business applications used in different departments of a company, in the exemplary case.

FIG. 6 illustrates an implemented method for accessing any data storage using URI and for presenting data in a certain context. As shown in FIG. 6, an enterprise can have a number of database servers 601A, 601B, . . . 601N. The enterprise can also interface to other database servers, for example, over a wide area network or over the Internet, see database servers 603A, 603B, . . . 603N. A storage layer 605 provides engine with the requested data from the particular storage.

Provided data 609 can be separated into the user data as axioms (facts) 607, and the ontology (presented as axioms as well, but which can be distinguished by N3 syntax). In other words, 611 contains information about what and how should be presented for the particular user in a particular Business Application. 611, 607 and 611 are processed by the Core and the result of processing is 613—the Engine (Engine is a part of Core), which can present data in a particular context (615) according to the ontologies.

The on-the-fly data representation can be illustrated with the following example. Consider the ontology data (i.e., the data that describes the entities which are being manipulated) in the context of business applications, for example, project management, issue tracking, bug tracking, CRM, etc. Each one is stored in its own database (or, alternatively, in a common database), and are combined at a higher level. With the aid of a logical core, it is possible to combine the various available data into different combinations and sets of ontologies, for example: using specific ontologies, a developer can see the context of the representation of the bug submitted by QA as a task, assigned to him, in other words, it is possible to track to which task each particular bug that is being worked on relates.

It is also worth discussing the difference between on-the-fly representations possible with the approach described herein, and such static representations as provided by OLAP cubes (online analytical processing in real time), which is one conventional technique for generating reports and different statistical documents. OLAP cubes are frequently used by analysts to quickly process complex database queries, and is particularly commonly found in marketing reports, sales reports, data mining, and so on. The reason that OLAP cubes are so widespread is the speed with which the processing can be performed. Relational databases store the information about the various entities in separate tables, which are usually well normalized. This structure is convenient for most operational database systems, however, complex multi-table queries are usually difficult to perform rapidly. A good model for such queries (rather than for changes) is a table constructed using facts from the OLAP cube. The cube metadata is typically created from a star schema or snowflake schema of tables in a relational database. http:**en.wikipedia.org/wiki/OLAP#Concept OLAP performs a slice of the relational database at a particular moment in time, and structures it into a spatial model for questions. OLAP structures, generated from the working data, are referred to as OLAP cubes. The cube is generated by combining tables, by using a snowflake schema or a star schema. In the center of the star schema is a table of facts, that contains key facts used to generate the queries. Multiple tables with changes are connected to the table of facts. These tables show how the aggregated relational data can be analyzed. The number of possible aggregations is defined by the number of ways in which the original data can be hierarchically displayed. The OLAP cube contains the basic data and the dimensional information (the aggregates). The cube potentially contains all the information that can be required for answering or responding to the queries. Therefore, to analyze the information, it is necessary to generate slices of the cube (represented by tables). For example, it is possible to look at various two-dimensional slices of the cube, moving the "location" of the slice vertically and horizontally in the cube, as well as opening and closing the levels within the cube.

The difficulty in using OLAP as a methodology is in generating the queries, selection of the basic data and generation of the appropriate schema, which is a reason why most modern OLAP products are typically supplied together with a vary large number of predefined queries.

Another problem is in the basic data of the OLAP cube, which needs to be complete and non-contradictory. Thus, the main problem with OLAP cubes is that the analysis process typically requires recreation of the cube itself, or frequent regeneration of slices. Unlike OLAP cubes, the proposed approach permits on-the-fly regeneration of data representation, without the complexities of predefined and pre-generated queries.

Figure 8:
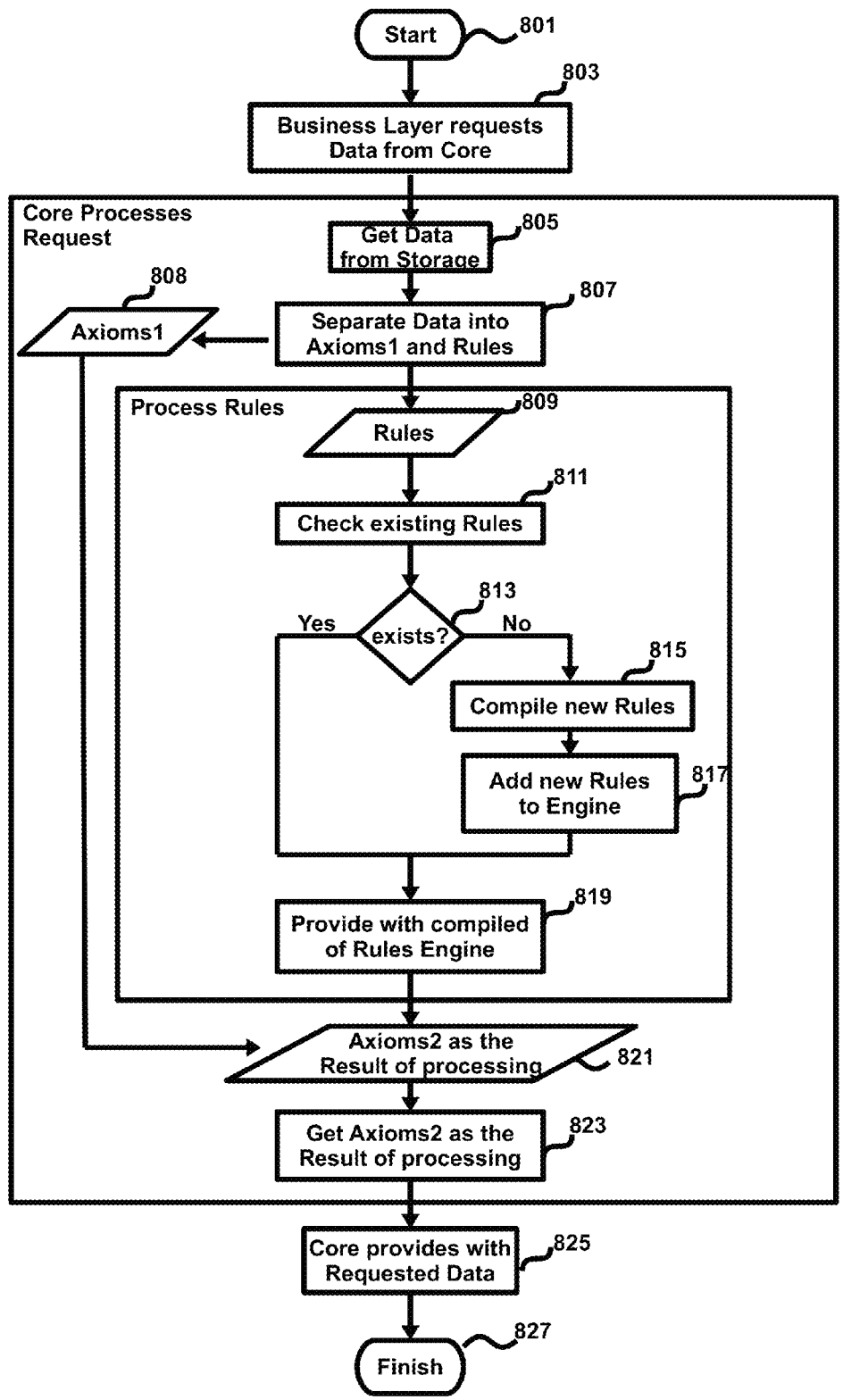
FIG. 8 illustrates a data processing algorithm, according to one embodiment of the invention.

In brief, the process of the approach discussed herein can be described as follows:
the business layer requests data from the core;
the logical core collects the data from different sources;
the logical core recognizes the nature of the data and divides the data into axioms and rules for example, for the bug tracker, an axiom could be "resolution: is "need more info"", and a rule could be { ?o operation:hasRequiredData ?f. ?f bfield:empty True.}=>{?o operation:allow False};
the engine required for completing Business layer request compiled Rules is put together (for example, in C# code, although the invention is not limited to any particular language).
The engine can have rules that were collected and compiled previously, as well as new rules, for those rules that have not been processed before. Therefore, the compilation needs only to be performed for new rules. Thus, the core does not need to constantly work with the data, but only addresses the data in response to requests from the business layer;
the engine processes the axioms, and the result new axioms are generated;
the core returns the requested data to the business layer.
FIG. 8 illustrates the algorithm of processing data, according to one embodiment of the invention. As shown in FIG. 8, after the start step (801), the business layer requests data from the core (step 803). In step 805, the data is received from storage, and the data is separated in to axioms and rules (step 807).

In the next step, user data, which is stored as facts (607 in FIG. 6), are received from storage, and are divided into rules (809) and data-axioms (808). In step 811, the existing rules are checked. If the rule exists, in step 813, the rules and the engine are used (step 819). Otherwise, after step 813, new rules are compiled (step 815). The new rules are then added to the engine (step 817). The system then begins working with the Engine, comprising the new rules (step 819). In step 821, the axioms are processed by the engine. As a result of Engine processing, new axioms (data required for the specific context) are requested (step 823). The core produces the requested data (provide user with the required context) (step 825). The process finishes in step 827.

Figure 9:
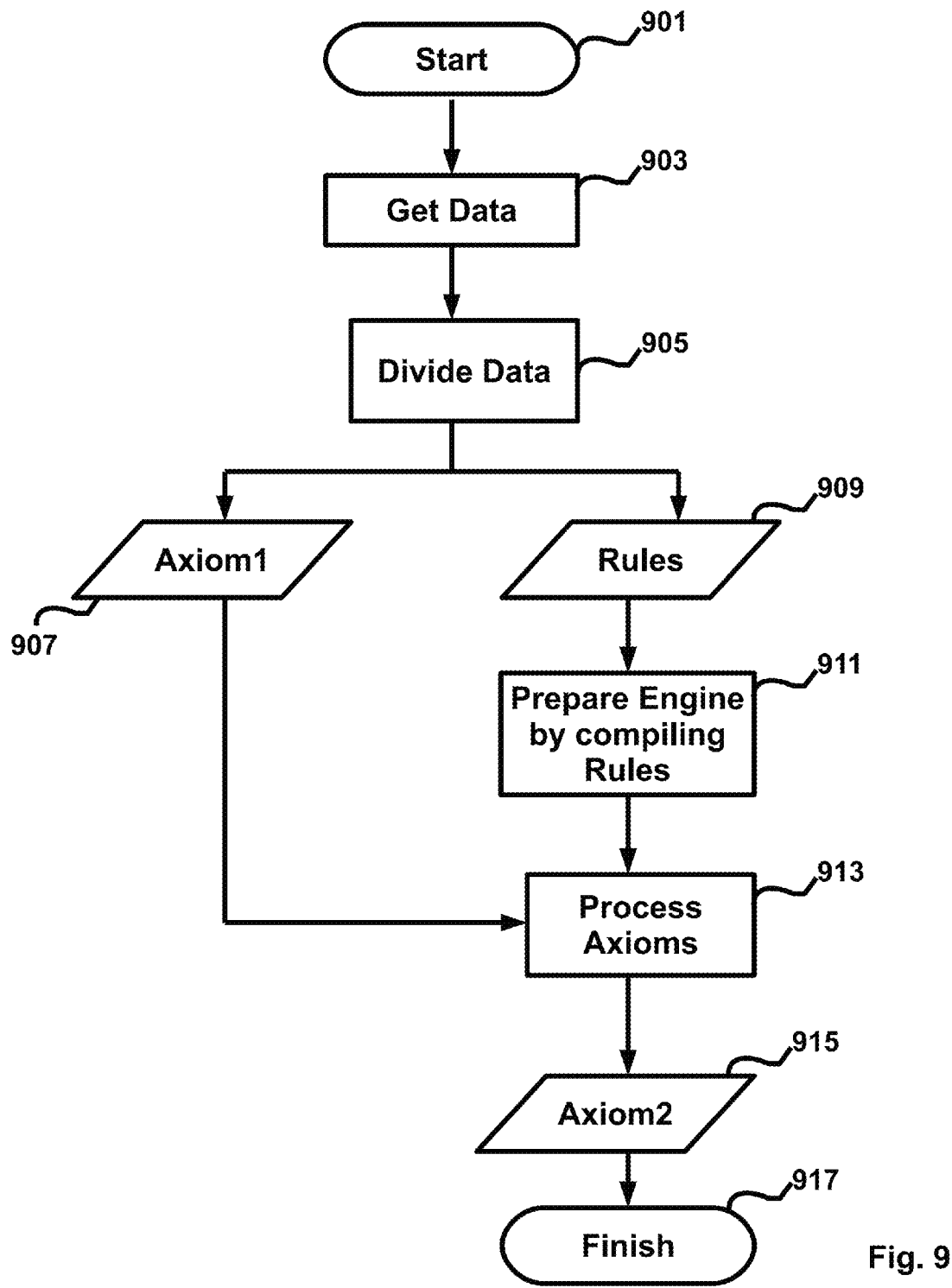
FIG. 9 illustrates more details of the algorithm of working with axioms and rules.

FIG. 9 illustrates Core processing algorithm of working with axioms and rules in the specific example (FIG. 9 illustrates the "Core processes request" block from FIG. 8). After starting (step 901), the data is received in step 903 from source identified by RDF URI. The data is divided, in step 905, into Axioms 907 and Rules 909. In step 911, the Engine is prepared by compiling Rules. In step 913, original axioms (User data) are processed by Engine. In step 915, new Axioms (i.e., contextualized data for the specific data representation) re received. In step 917, the process finishes.

By way of example, there are several types of rules. The filter type rule is frequently used in the tracker cases, for example, receiving a list of support ticket/bugs/tasks of a particular user and a particular project with particular attributes. Therefore, from the overall pool of tasks/bugs/tickets, the information needs to be filtered for the particular user and project, and presented in the form of separate axioms.

Transformative rules relates to the same information that can be presented in a different manner. For example, the IT department views people as users of the IT system. On the other hand, a project manager can view the same people as resources working on particular tasks. As another example, transformative rules can include the following: at the input, data (axioms) is received, that describes a particular ticket (i.e., requests from a particular end user) and t its data representation. Therefore, the engine will receive, at the output, axioms in the form of a specific user interface, filled in with data.

Another example of a type of rule is a generating rule. For example, in a particular project that has more than 50% critical bugs and more than 50% critical tasks, the system will automatically generate the fact about project status (e.g., the status of the project will be listed as "Critical").

Further by way of example, below is how the three rule types given above can be combined using the N3 syntax:
@prefix bug: <http://<company name>.com/tracker/bugs#>.
@prefix task: <http://<company name>.com/project manager/tasks#>.
@prefix prj: <http://<company name>.com/projects#>.
@prefix math: <http://<company name>.com/mathematic#>.
@prefix assert: <http://comindware.com/logics/assert#.
@prefix cmw: <http://comindware.com/logics#.
First, the information is transformed from the bug tracker and from the project management task into the data for the ABC project.

Then, only those bugs that have the status "critical" are filtered to remain and the engine counts total quantity of bugs, and then, if the quantity of "critical" bugs is more than a half of total, then generate critical state of project bugs:

{ ?bug cmw:is bug:Bug. ?bug prj:included prj:Project_ABC. {?bug prj:Status prjStatus:Critical} assert:count ?numCriticalBugs. { ?bug prj:Status ?any} assert:count ?TotalBugs. (?TotalBugs 2) math:divide ?halfTotalBugs. ?numCriticalBugs math:greater ?halfTotalBugs.} => {prj:Project_ABC prj:BugsCritical true}.

The same operations under data (tasks) from project management systems

{ ?task:is task:Task. ?task prj:included prj:Project_ABC. {?task prj:Status prjStatus:Critical} assert:count ?numCriticalTasks. { ?task prj:Status ?any} assert:count ?TotalTasks. (?TotalTasks 2) math:divide ?halfTotalTasks. ?numCriticalTasks math:greater ?halfTotalTasks.} => {prj:Project_ABC prj:TasksCritical true}.

Next, the automatic generation of the "Critical" project status is performed, if the project has tasks and bugs in "Critical" states:

{prj:Project_ABC prj:BugsCritical true. prj:Project_ABC prj:TasksCritical true}.=>{ prj:Project_ABC prj:Status "Critical" }.

The same happens with project status but with another condition: automatic generation "Critical" status for project when "critical" bugs OR tasks is more than half.

{ ?x cmw:is task:Task}=>{ ?x cmw:is prj:TaskOrBug}.
{ ?x cmw:is bug:Bug}=>{ ?x cmw:is prj:TaskOrBug}.
{?x cmw:is prj:TaskOrBug. ?x prj:included prj:Project_ABC. {?x prj:Status prjStatus:Critical} assert:count ?numCritical. { ?x prj:Status ?any} assert:count ?Total. (?Total 2) math:divide ?halfTotal. ?numCritical math:greater ?halfTotal.}=>{prj:Project_ABC prj:Status "Critical" }.

As will be appreciated, real-life examples are typically more complex than this, and there can be many more types of rules in most real-life cases, however, the principle is the same.

Example of Conjunction of Axioms

The axiom conjunction example is frequently the most easily understood one. For example, when combining information regarding the requirements of the project (axiom "requirements"—requirements, defined by analysts) and bugs from the bug tracker (axiom "bugs"—bugs, identified by the testers, who are typically quality control engineers, and fills out the bug tracking forms based on certain requirements), "result axiom" results, which, in essence, is a combination of how many bugs are associated with a single functional requirement.

Figure 10:
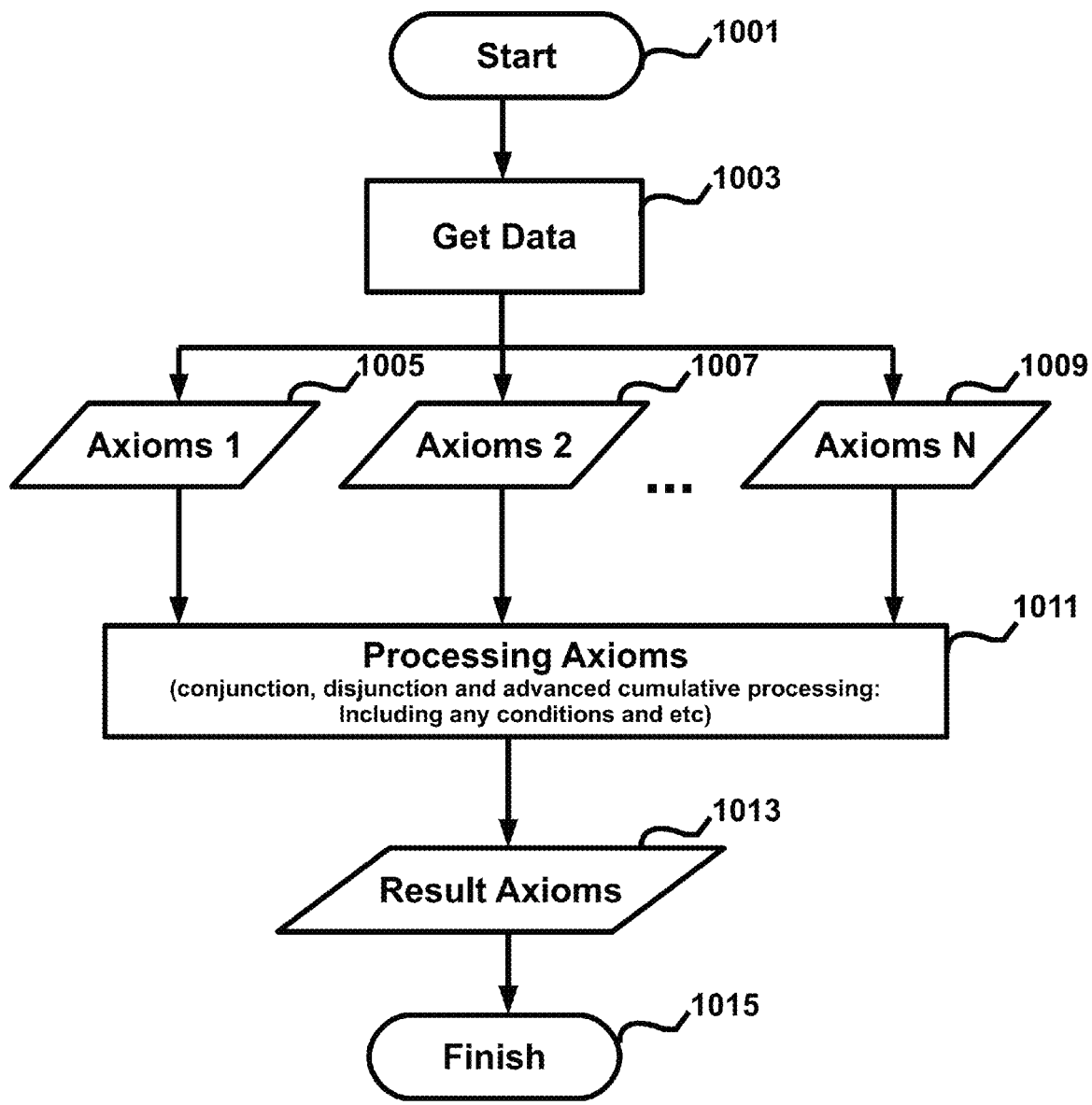
FIG. 10 illustrates various operations under axioms, including conjunction and disjunction.

This is illustrated in FIG. 10. After starting the process (step 1001), data is received from any storage identified by a URI in step 1003. In step 1007, axiom 1 is identified. In step 1005, axiom 2 is identified, etc. In step 1009, the axioms are processed, see result in "Result Axioms" (step 1011). The process finishes in step 1013.

Another illustrative example is the use of semantic web concepts and the notational/syntactic approach described herein to describe the process of manufacturing a toy car. Assume that the production of the toy car uses a tracker to track the state of changes of the assembly. In this case, the axioms relate to any data that is received by the system, in the form of the triplet (subject, predicate, object). These are:

wheels for a Jeep
wheels for a Truck
front wheels for a Sports Car
rear wheels for the Sports Car
body of the Jeep
body of the Truck
body of the Sports Car
Jeep suspension
Truck suspension
Sports Car suspension The rules in this case have a similar appearance, and can look something like as follows:

{ ?y toys:wheels ?x. ?y toys:suspension ?z}=>{ ?y toys:chassis (?z ?x)}

This rule, written in N3 syntax, means that if something (X) is a wheel belonging to the car Y, and Z is a suspension of the car Y, then their conjunction will represent the chassis for Y. In this matter, all the other rules will be formulated. As specific examples, the following rules could be created:

Suspension of the Truck should be joined with wheels of the Truck→chassis of the Truck, where the chassis of the Truck is axiomN+1 from FIG. 10, i.e., this is a result of the particular rule.

Chassis of the Truck join with body of the Truck→Truck
Jeep suspension join with Jeep wheels→Jeep chassis
Jeep chassis joined with Jeep body→Jeep
Sports Car suspension joined with wheels of Sports Car→chassis of Sports Car
Chassis of Sports Car joined with body of Sports Car→Sports Car Therefore, all of the axioms and rules are in storage, and when the user, working with the business layer of the system, performs some action (for example, he puts together the wheels and the suspension of the Jeep, and wants to make changes in the tracking system, e.g., toy assembly tracker, that represents the tracing of the assembly—in other words, an alternative representation is in the form of case management), the business layer (see 607-609) transmits a request to the core, and the core 607-613 performs the calculation.

Consider further the concept of a "case" for this example. In this example, case 123 has:

Case Id 123 Assembly
TargetAssembly object: Jeep
Facts: Ready (i.e., fully assembled, otherwise, some fact would not be present)
Body ready
Wheels Ready
Chassis ready
Suspension ready Therefore, for this case, the following actions can be performed:

a) Add part (id)=>Case has a car part (for example, add the body, id=some identifier of a part of the car b) to assemble wheels and suspension, the following construct can be used:

Assemble parts (id1: id2)
   id1 assembled with id2
id assembled id 3=>(Case has newpart)

Figure 11:
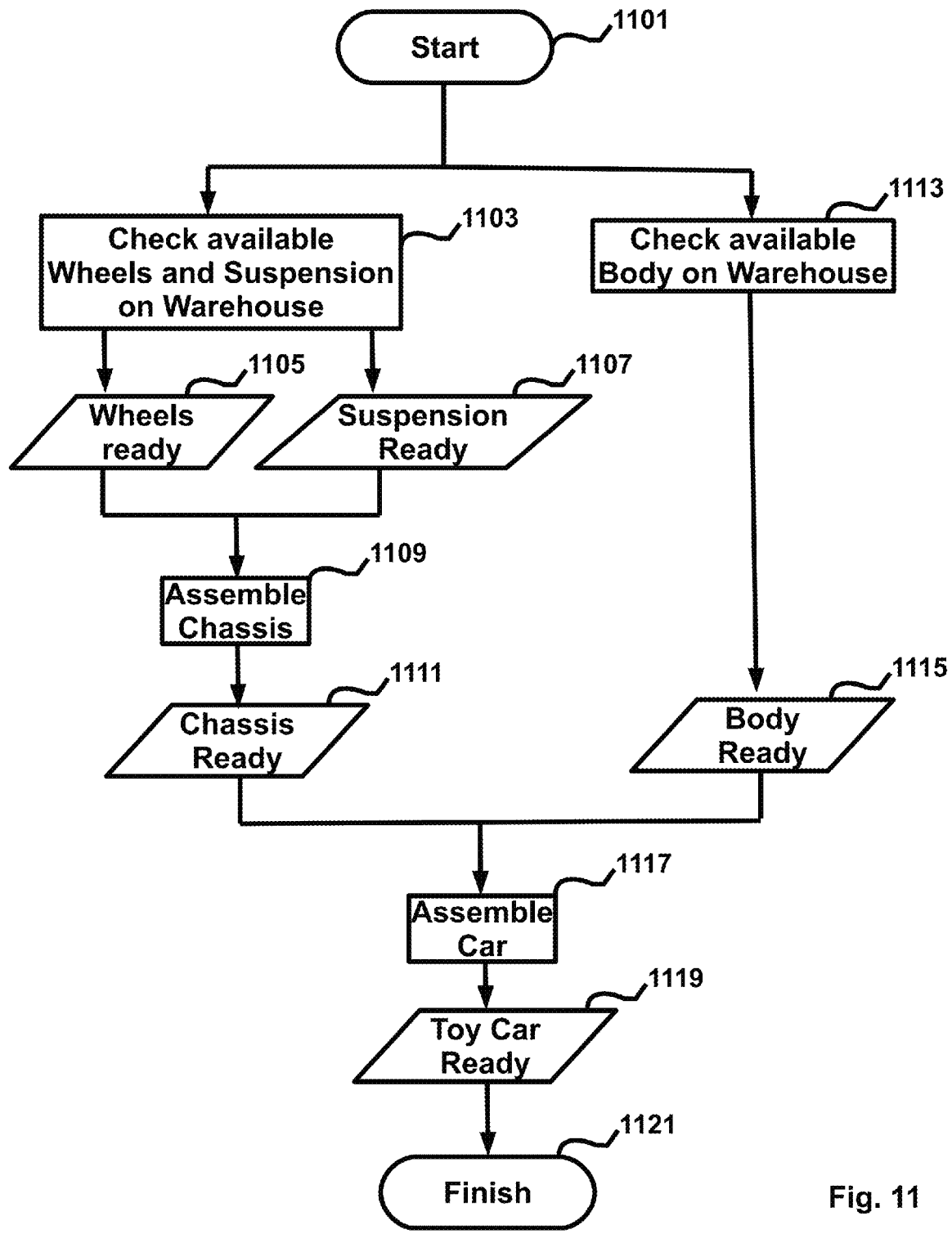
FIG. 11 illustrates an example of application of the principles described herein.

(in other words, this rule corresponds to transitioning to block 1111 in FIG. 11).

Based on the rules, it is possible to receive a list of allowable actions for a particular stage in the assembly, which is why it can be described as "case" and "instruction" (e.g., case when the assembly cannot be completed, because there is no body in the warehouse).

Considering the fundamental actions performed by the system, N3 has been chosen, in this example, as the syntactic notation, which means that all the data is stored in a certain format, defined by this notation. On the other hand, CmwL means that the user's own predicate can be used to describe the system, how it works, etc.

This is illustrated in FIG. 4. For example, the data is stored in the text file example.N3

@prefix cmw:<http://www.comindware.com/logics#>.
@prefix toys:<http://toys.com/description/toys#>.
toys:wheel cmw:belongs toys:track.
{ ?y toys:wheels ?x. ?y toys:suspension ?z}=>{ ?y toys:chassis (?z ?x)}

From this, it is clear that the prefix is the place where the specific predicates are formed. In other words, "belongs" is a cmw (an abbreviation that refers to http://www.comindware.com/logics#, and which can contain the necessary logic, i.e., is a CmwL (Cmw Language), while the general syntax is N3. Therefore, in the toy car manufacturing example, there is specific data describing this case. Therefore, the engine (see FIG. 6) can take the data from the storage layer, where, using the N3 notation, the axioms and the rules are stated. The engine can parse the rules, and based on the parse rules, can receive the data to work with the system—i.e., the business application that is used at the moment.

Thus, once the N3 rule has been parsed, it can be used by engine to provide contextualized data to a particular business application for modifications and further work with it. The advantage, compared to OLAP cubes, is that the information can be represented as a "slice" at any time, without a need for recompilation—the information has already been parsed, and there is no need to parse it or compile it again. For example, for the accounting department to calculate the sales receipts from all the assembled toy cars by a particular salesman, it is sufficient to take the information that has already been compiled about the cars that have been put together, and apply to it the rules that filter out information based on the identity of the employee. In other words, there is no recompilation that is needed, but only to change the representation of the information. (See the Formula 1 example below.) For data representation—a switch between contexts of the specific business application—the F1 example is illustrative.

Formula F1 example:
F1 team Ferrari 2004 year
People:
Drivers:
Michael Shumacher
Rubens Barichello
1 Team manager
20 engineers
2 cars/8 wheels/2 suspensions/2 chassis/8 engines for whole season/2 car bodies/15 grant prix in season/1 grand prix is 3 practice races, 1 qualification race and 1 main event—main race/need 15 engineers on race/
Team needs:
1 system for tracking car building (analogous to task tracker for engineers), so in real use case it can be viewed as:
Engineer/Driver logins in system and work with tasks (tasks can look like: assemble chassis assigned on the concrete engineer or test car and drive several laps before Canadian Grand Prix assigned on Michaels Shumacher)
1 system to manage people on races (analogous to a project for a manager) e.g., a manager uses engineers and drivers as resource for a specific race.
Comindware architecture
Have Storage with Data (written in N3 notation: subject-predicate-object):
Axioms:
Shumacher is driver
Peter is engineer
. . .
car requires 4 wheels
car requires 1 engine
. . .

Set up system rules as follows:
driver can use only prepared car (in N3, it can look similar to the toy car example)

The core parses data after receiving Business layer request and compiles the Engine (based on parsed rules). The compiled engine, therefore, knows how to display information for a particular query (in other words, depending on the context, the representation of the information can be different). The core compiles additional rules for Engine only if the specific rule was not parsed before.

When an engineer logins into the system, he sees tasks—what he should do. Following the rules, he assembles the car and updates task statuses. He also changes available car details in the system, because details are resources for the Task The task tracker for mechanics who are servicing the car, to track its readiness for the race, knows that engineers login, and the Engine provides users with information when people is user (task owner for example) and detail is resource. The Engine presents the information in a certain context, here, presenting information to mechanics.

When a manager logins to assign people to the race, he sees people as resource for the specific race. Therefore, for a manager, it will be a different tracker, more akin to a project management software, and the mechanics are resources for the manager's tracker, even though the same mechanics were ordinary users when the car needs to be serviced.

In the proposed architecture, all data can be used in different business applications, using in different business applications, with the specific contextualized views (see FIG. 6) The same system using relational databases or OLAP cubes requires duplicating information in several databases (Peter engineer as engineer for project system for assigning him on the concrete race, and Peter as user for Task tracker during car assembling process). Conventionally, if Ferrari hires a new driver, he needs to be added in project system as resource and in task tracker as user.

A slice is a query for the specific "table of facts", which requires from the user to reconfigure slice every time when the user needs to change any field in table of facts, because they have relational databases (e.g., change driver field as resource for driver as user in table of facts). The proposed architecture configures on-the-fly, because there is no duplicated data.

In one embodiment, a Comindware® database uses internal binary format to store axioms and rules. The storage is optimized for fast axiom search and retrieval. The following data types are supported for any part of an axiom triplet (subject, predicate or object):
URI—this corresponds to URI in RDF graph definition.
Blank node—an anonymous resource name, as defined by RDF
Unicode string literal—contains Unicode string of arbitrary length
Integer literal—Contains a 32-bit signed integer
Decimal literal—Contains 128-bit number. This data type is suitable for financial and monetary calculations
Date/Time literal—Contains date and time value in UTC time zone
Duration literal—Contains time interval (e.g. 4 hours)
Boolean—Contains either "true" or "false"
N3 Formulas—an ordered collection of triplets. E.g. {:car :color :red. :car :model :x}
N3 Lists—an ordered collection of names or literals. E.g. (:red :blue :orange)

Unlike RDF, any data type can be used in any place of a triplet in

Comindware Database. For instance, "1"^^xsd:integer log:equalsTo "example"^^xsd:string.

Rules are stored as axioms with the following structure. Subject is a formula, containing a logical conjunction of triplets comprising rule logics. Predicate Is set to log:implies, often denoted as "=>". Subject is a formula that contains implication triples. Consider the following rule:

{ ?o operation:hasRequiredData ?f. ?f bfield:empty true.}=>{?o operation:allow false}

Here "{ ?o operation:hasRequiredData ?f. ?f bfield:empty true.}" is a subject formula "=>" is a predicate, "{?o operation:allow false}" is an object implication formula.

Comindware® language extensions is a set of built-in predicates in addition to those defined by RDF (log namespace). Comindware® extensions are placed in "assert" namespace:

@prefix assert: <http://comindware.com/logics/assert#>.

The following extensions are defined:

assert:iff. Allows conditional evaluation of logical conjunctions. Example

{ { ?car :color :red} assert:iff({?car :type :cabrio} { ?car :color :blue})}=>{ ?car :pretty true}.

This defines that car is pretty if it is of type cabrio and has red color OR any type and has blue color.

assert:count. Counts matching statements and returns a number.

{ { ?car a :Car} assert:count ?n}=>{ :Car :count ?n}. Counts all cars assert:sequence. Generates an N3 list from statements.

{ ({ ?car a :Car} ?car) assert:sequence ?carList}=> { :result :carList ?carList}. Generates a list of all cars assert:distinct. Filters a set of statements to contain only unique values of a variable { { ?car :color ?color} assert: distinct ?color}=> { :result :carColors ?color}. Generates distinct set of all existing car colors.

assert:cut. Limits a set of matching statements by a given number

{ { ?car a :Car} assert:cut 2}=>{ :result :cars ?car}. Generates a set of at most 2 cars.

assert:abort. Aborts calculations with specified error message. This is useful for diagnostics and error tracing.

{ ?car :color ?color. {?color log:equalsTo red.} } assert:iff ({:car assert:abort ("red car is not allowed")}{ }).}=> { :result :cars ?car}. Generate a set of all cars, checking that there are no red cars.

In a complex system with multiple users and applications. data can be partitioned between databases in one of the following ways, to achieve data and context isolation.

Figure 17:
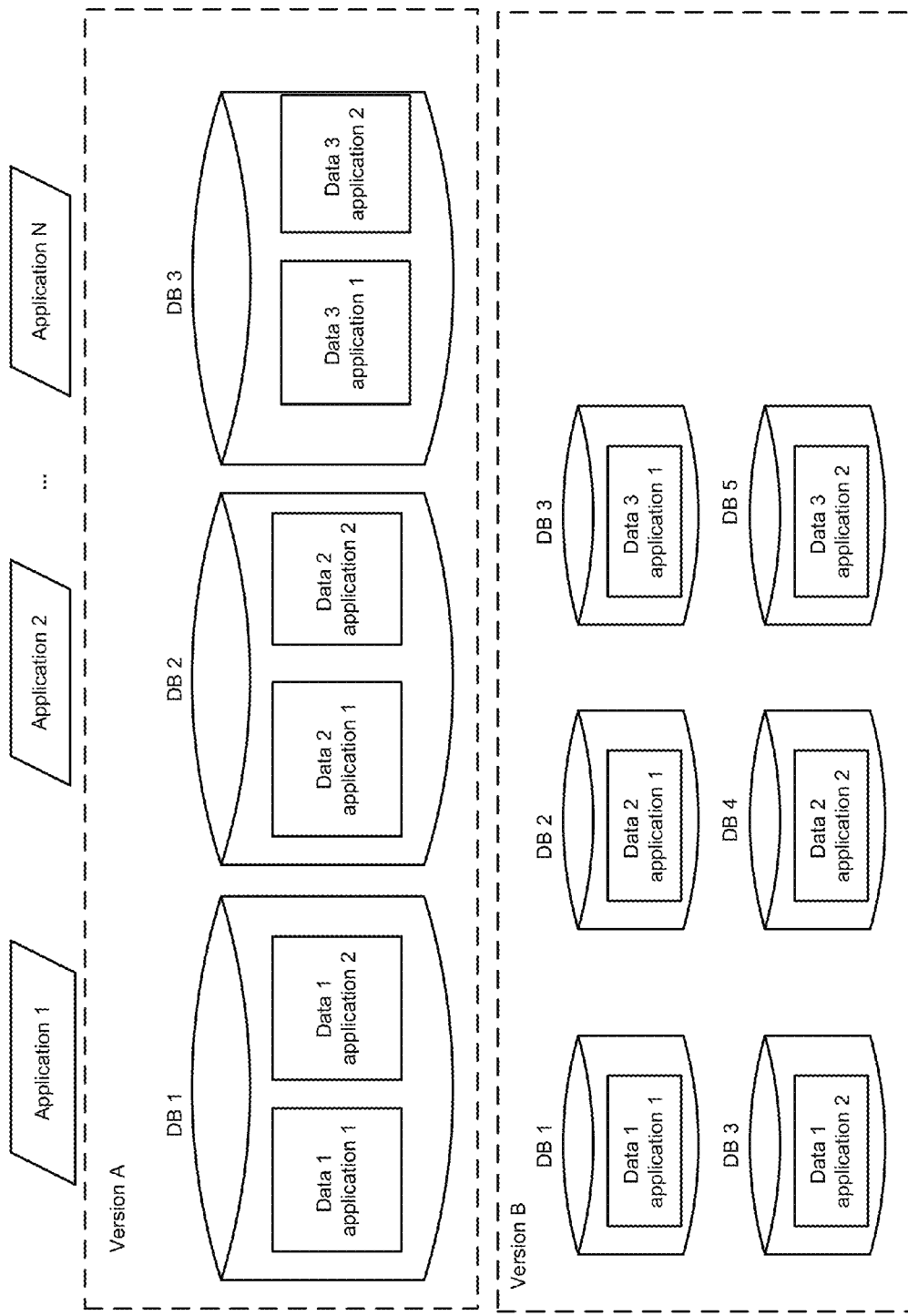
FIGS. 17 and 18 show different ways of partitioning databases.

(i) By application (see FIG. 17). Each application has its own database that stores data processed by application. In this scheme there are two types of data context. Application context provides access to application data for a particular application. Other application's data is not accessible in this database. Global context provides access to data across multiple applications. This context can be used for reporting and collecting statistics.

Figure 18:
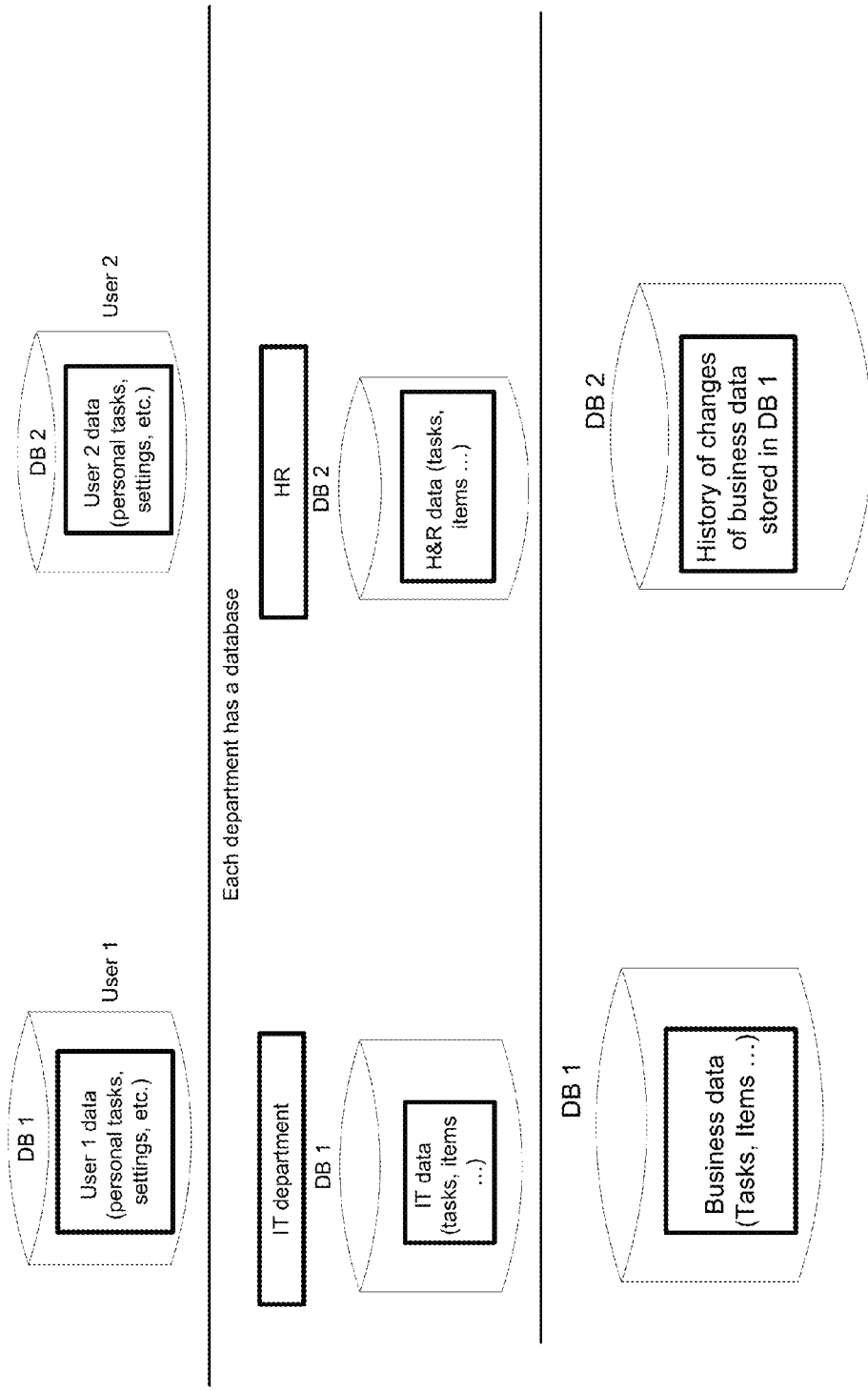

(ii) By data owner (see FIG. 18). In this scenario, each user has its own database with personal data. A separate database can be used for shared data. In this case user data context joins user database with shared database to allow users access to personal and shared data. Global context can access data across users for reporting, statistics or administrative tasks.

(iii) By data type (see FIG. 18). In this scenario, each database holds data of a particular business data type. For instance, one can use a separate database for tracking orders and a database for order history. In case of task management system, there can be three databases: one that contains all employee information, another one for tasks and third one for calendar events. A simple context containing only most-used data of a particular type is used for majority of queries, while a full context containing all types of data is used only in occasional complex queries. In example above users mostly work with orders and only in some rare cases require order history.

In some cases using a combined approach is possible. For example there can be databases for each data type and an untyped database for each user with personal data.

Any of the databases can be divided into multiple sub-databases.

Figure 13:
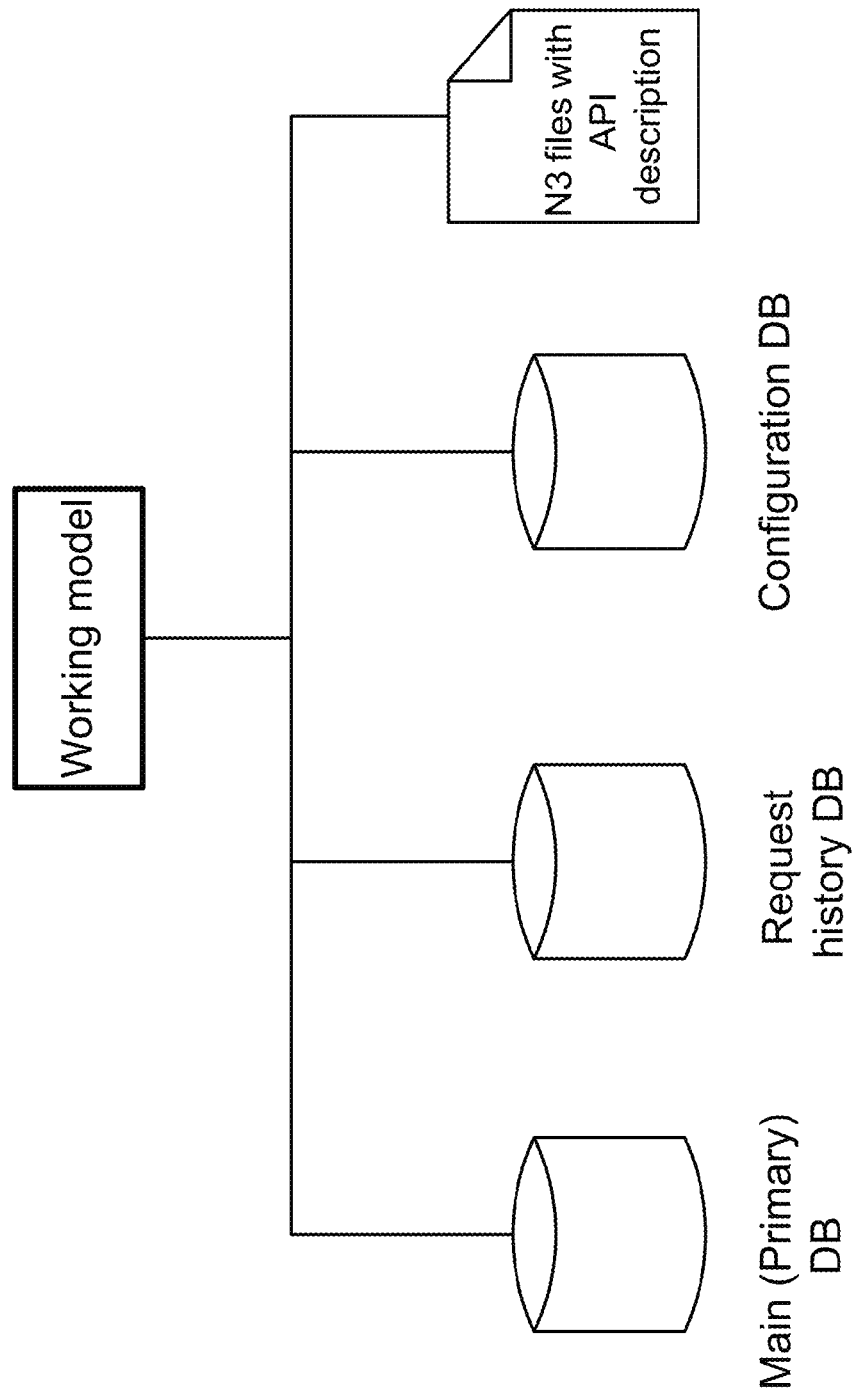
FIG. 13 shows the primary sources of data in the models.
Figure 14:
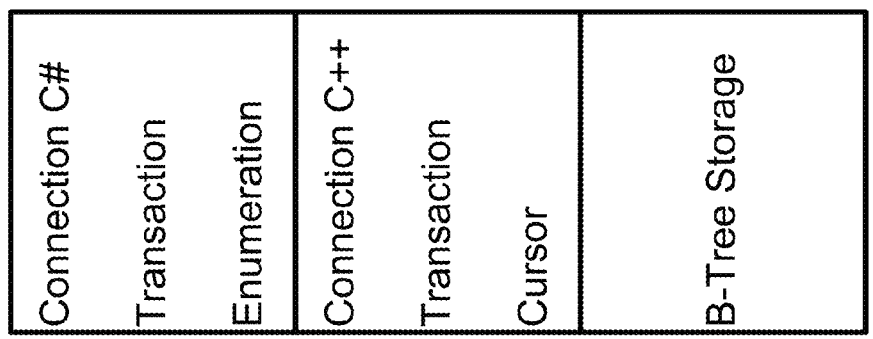
FIG. 14 shows a logical organization of the database module.

When describing an operation or a request to the database, the model configuration is provided, where the operation will be performed within the framework of that model. The model can be a combination of several data sources, such as databases and/or ontology files. A model is effectively a data context that provides an interface to access data from multiple databases and other data sources. Within a single transaction, all changes are performed for only a single database, even when data is stored in multiple databases. In one embodiment, there are four primary sources of data, see FIG. 13:

1. User data database
2. Operations history database
3. Configuration database, which contains application settings
4. Ontology files in N3 format FIG. 14 shows a block diagram of a database arrangement. The database module has 3 primary functional layers:

A wrapper layer, implemented, e.g., in C#. The wrapper is responsible for converting data into a format used by the next layer.

An access layer, implemented, e.g., in C++, which is responsible for logical links between the data stored in the databases.

A Btree storage layer, which stores the actual user data in the form of a BTree.

FIG. 14 thus shows the primary components of each layer, and how the implementation distributes the components between the layers.

The client-side user database stores N3-format data. The database module permits the users to manage their data on a client machine, even with limited access to the server or with no access to the server at all. This reduces load on the server, and permits the user to change, add, retrieve and modify data on the fly. Typically, large packets are used to transmit data to the server and for processing and publishing the data on the server. Since the same format is used on both the client and the server sides, there is no need for data conversion between client and server.

Figure 15:
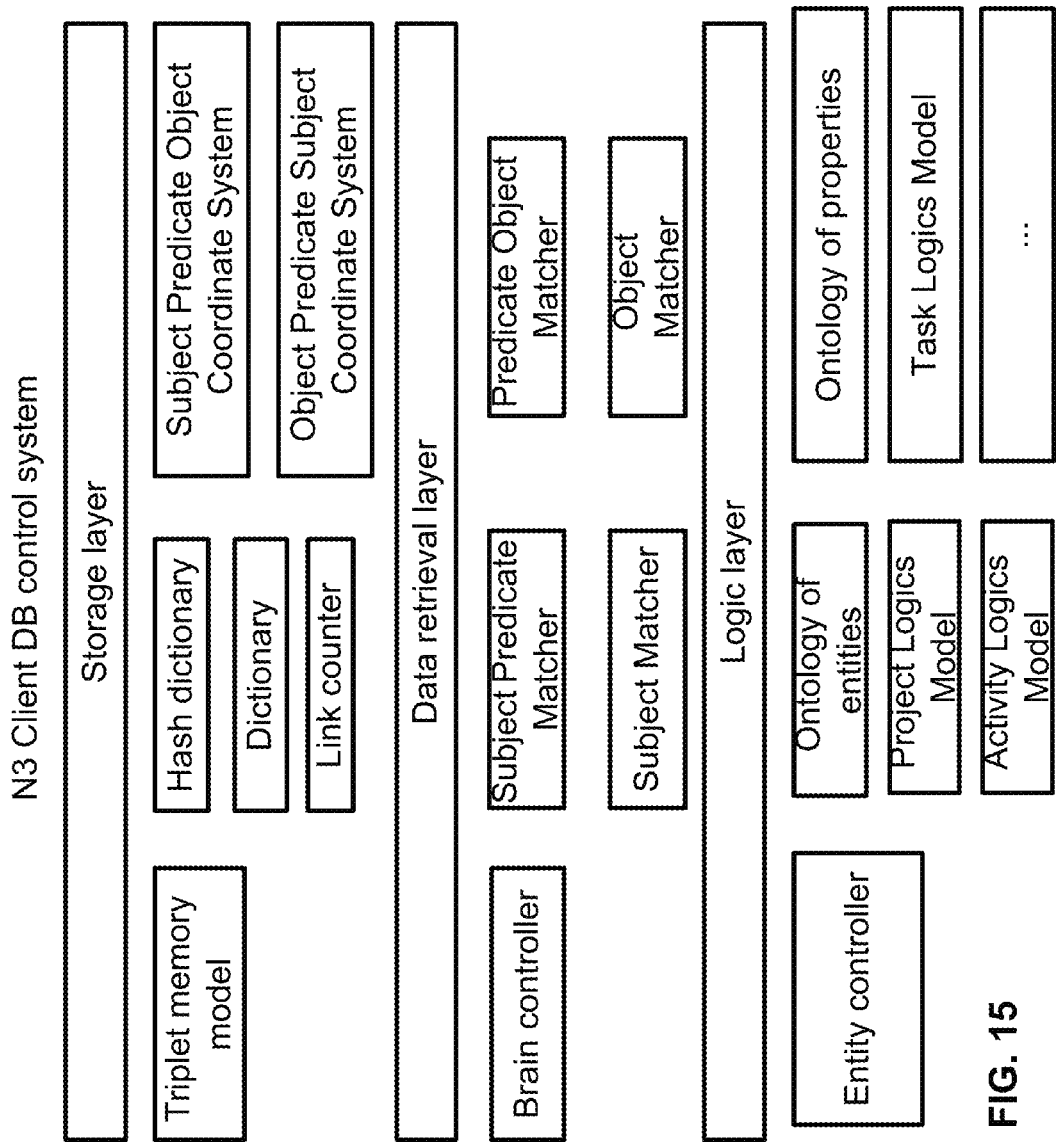
FIG. 15 shows primary elements for managing databases on the client side.

On the client side, there are three primary elements for managing databases, see FIG. 15:

A storage layer;
A data retrieval layer;
A logic layer.

The storage layer has the following components:

Memory triplet model is the primary component that manages other component. It represents basic, low-level mechanisms for adding, editing, deleting and retrieving data.

A dictionary is a list of "words", which may be any constants, such as "My favorite movie", or "May 12, 2013", or "25.4". Each word has a unique identifier in the dictionary, and are accessed using an index.

A hash dictionary is a reverse of the dictionary, which permits accessing the index using the words.

A link counter is a subcomponent for storing links for each word. Each time a word is used in a particular context, the counter is increased by one. When the word is deleted, the counter is decremented.

A subject-predicate-object coordinate system can be used to represent contexts, or facts, as points in a three dimensional space. For example, consider three facts: "Peter likes cars", "Peter likes fishing" and "Jason likes fishing". Presumably, all of the words used in these facts are already in the dictionary, and appropriate indices are already known, e.g., (Peter, 0), (likes, 1), (cars, 2), (fishing, 3), (Jason, 4). Then the facts can be represented as (0, 1, 2), (0, 1, 3), (4, 1, 3).

An object-predicate-subject coordinate system represents a similar concept except that the facts are written in reverse for future access to the objects.

The data retrieval layer has the following components:

A "brain controller" provides an open interface to data retrieval functions. It permits the user to process simple and simplified requests through the mechanism of Matcher Sequence Processor.

The Matcher Sequence Processor represents functionality for processing coincidences sequentially, using output parameters from previous coincidences as input parameters for the next coincidence. Recursive processing is also supported, e.g., "What does Peter like that Jason also likes?" (in natural language, or "Peter like ?x. Jason like ?x.; Match ?x" in a more formal language), whose result would be "fishing" in the above example, as well as filtering (i.e., additional conditions for coincidences, e.g., "who likes fishing and has a phone number that begins with 212?"

A Subject Predicate Matcher permits the user to retrieve data based on known subject and predicate. For example, based on the facts above, the brain controller can be asked "What does Peter like?" In a more formal representation, parameters "Peter" and "like" can be given to the Subject Predicate Matcher, which will collect all the facts containing "Peter likes . . . " as subject and predicate. In this example, the result will be "Peter likes cars and fishing".

A Predicate Object Matcher deals with other coincidences, for example, such queries as "who likes fishing?" In this case, the verb "likes" and the object "fishing" are known. The result will be "Peter likes fishing. Jason likes fishing".

A Subject Matcher is a component similar to those described above, but as an input parameter, it only uses the subject.

An Object Matcher is a component similar to those described above, but as an input parameter, it only uses the object.

The logic layer includes the application logic, such as rules, restrictions, business object descriptions, and their properties. Its primary components are:

Entity controller is an open interface for creating, updating, deleting and retrieval of business object data. It works with ontologies of properties, ontologies of entities, triplet memory model, the Brain Controller, as well as different models of business objects.

The API methods of the logic layer are generally of two types—requests, and operations. Requests are intended to retrieve data from the database(s). Operations are intended to modify the data. After changes in the system DB (i.e., user data DB) during an operation, the changes are analyzed to determine if they should be reflected in the history—the user fields and some system object fields are selected, and then sent to a special object called history saver, which is responsible for writing the change history into the appropriate database and joining the entries for each object's history.

Changes are written to a special history database, for example, as a separate thread, after the operation is finished. The entries can be in a format along the lines of:

Link to changed object
Author of change
Date of change
Type of change (create, edit, comment, etc.)
Fields changed
Deleted (old) values
Added (new) values If, during some time period (e.g., N minutes) the same user makes similar types of operations with the same object (for example, user John Smith edits the object "Bug 120"), then entries in the history database can be combined into a single entry. The history saver maintains an internal list of link to the latest changes for each object. When a new entry is received, first it checks if the new entry can be combined with a prior entry. Then, based on the check, it either creates a new entry or edits an old entry.

Figure 16:
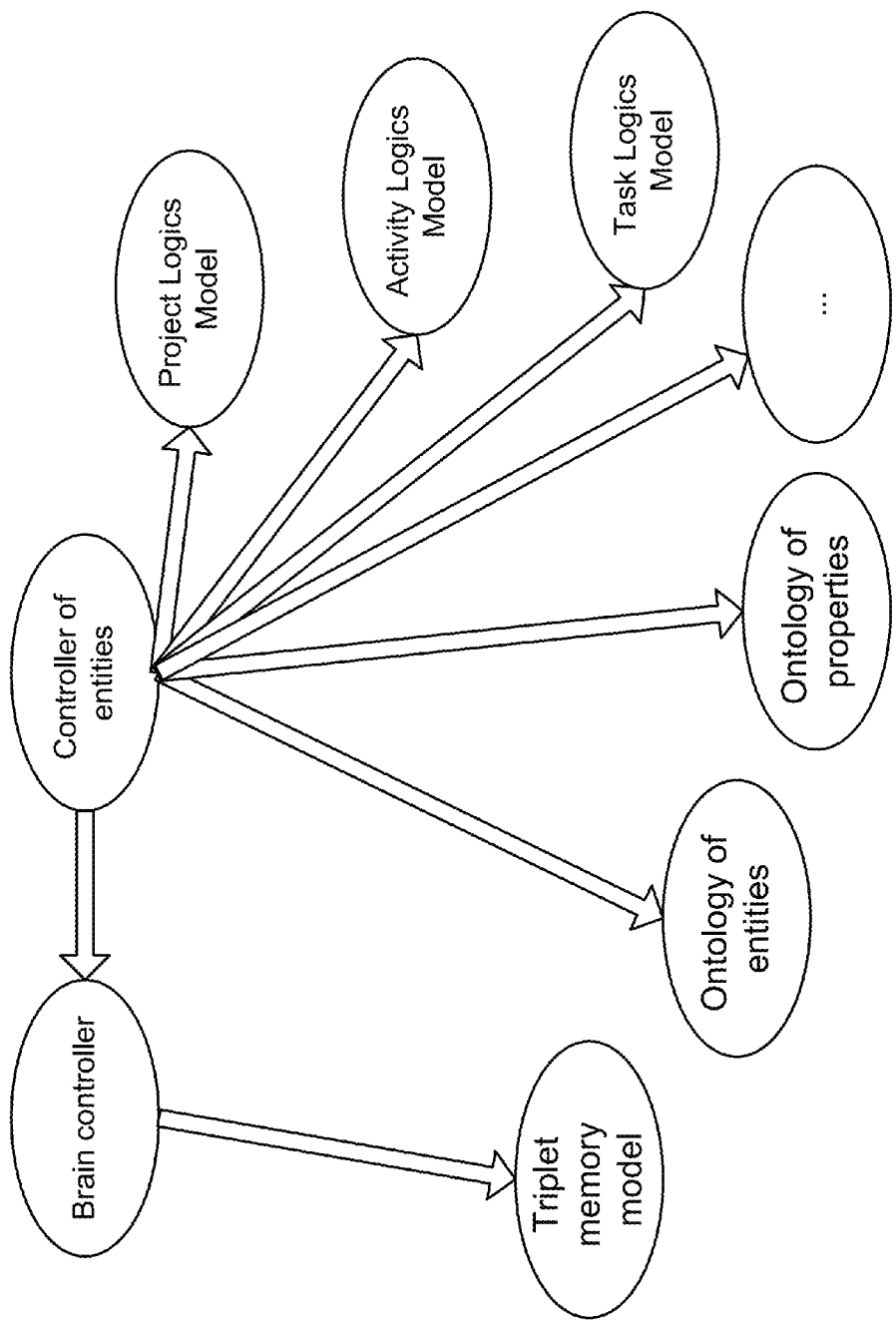
FIG. 16 shows the ontologies.

FIG. 16 shows the ontologies. The ontology of entities is a tree-like structure that describes which properties a business object has, and the releationships between the objects. For example, an ontology defines a business object "Project" and lists all its properties, such as "Start date" or "Title".

The ontology of properties is a catalog of all possible properties in the system, together with their types and other attributes, e.g. format, e.g. "Start date" property has the type "date" and format "month/day/year".

A Task Logics Model is a structure that includes rules and restrictions for setting up and accessing properties of the tasks of the business object. For example, a rule can be "If the completion date of a task is moved, and the task is part of a project, then the completion date of the project is also moved."

System objects model generally reflects the component model described above. When receiving a request to one of the web API methods, the designated controller performs the requested action and returns the required result. The results can be in any format suitable for further processing, such as trees, graphs, lists, tables, text, JSON objects, or any other format specified by the user.

Comindware provides an ontology for metadata description similar to those defined by OWL and RDFS. The following ontology is self-describing as it is defined in its own terms. This ontology introduces a notion of Class and Property.

A Class is a set of metadata describing a particular data type. Class has the following attributes:

Name defined by className predicate
Description defined by classDescription predicate
A set of properties, defined by property predicate.
Parent class. This is indicates that this class inherits a set properties from given parent class.

A Property describes a particular predicate and constraints over statements that use that predicate. Property has the following attributes:

propertyName—a string defining property name as it is displayed to the user
propertyDescription—a string defining property description as it is displayed to the user
propertyType—indicates a class that objects must belong to
propertyAttributes—specifies a number or constraints on property values. Possible constraints are:

mandatory—the value for this predicate must be present in class instance multiValue—There can be multiple statements with given subject and predicate, but with different objects. If this is not specified, an instance can contain only one or zero statements (objects) with this predicate.

An exemplary ontology itself can be as follows:
@prefix xsd: <http://www.w3.org/2001/XMLSchema#>.
@prefix log: <http://www.w3.org/2000/10/swap/log#>.
@prefix cmw: <http://comindware.com/logics#>.
cmw:Class a cmw:Class.
cmw:Class cmw:property cmw:parentClass.
cmw:Class cmw:property cmw:className.
cmw:Class cmw:property cmw:classDescription.
cmw:Class cmw:property cmw:property.
cmw:parentClass a cmw:Property.
cmw:parentClass cmw:propertyType cmw:Class.
cmw:parentClass cmw:propertyAttributes cmw:multiValue.
cmw:className a cmw:Property.
cmw:className cmw:propertyType xsd:string.
cmw:classDescription a cmw:Property.
cmw:classDescription cmw:propertyType cmw:Class.
cmw:property a cmw:Property.
cmw:property cmw:propertyAttributes cmw:multiValue.
cmw:property cmw:propertyType cmw:Property.
cmw:PropertyAttribute a cmw:Class.
cmw:mandatory a cmw:PropertyAttribute.
cmw:multiValue a cmw:PropertyAttribute.
cmw:Property a cmw:Class.
cmw:Property cmw:property cmw:propertyName.
cmw:Property cmw:property cmw:propertyType.
cmw:Property cmw:property cmw:propertyDescription.
cmw:Property cmw:property cmw:propertyAttributes.
cmw:propertyName a cmw:Property.
cmw:propertyName cmw:propertyType xsd:string.
cmw:propertyType a cmw:Property.
cmw:propertyType cmw:propertyType cmw:Class.
cmw:propertyType cmw:propertyAttributes cmw:mandatory.
@in ?property.
{
  ?property cmw:propertyType ?type.
  @if-not { ?type cmw:className ?name} @then
  {
    ?type→?name.
  }
{ =>{ ?property cmw:propertyTypeDisplay ?name.}.
cmw:propertyDescription a cmw:Property.
cmw:propertyDescription cmw:propertyType xsd:string.
cmw:propertyAttributes a cmw:Property.
cmw:propertyAttributes cmw:propertyType cmw:PropertyAttribute.
cmw:propertyAttributes cmw:propertyAttributes cmw:multiValue.
in ?class.
{
  ?class cmw:parentClass ?parent
}=>{ ?class cmw:allParents ?parent}.
in ?class.
{
  ?class cmw:parentClass ?parent.
  ?parent cmw:allParents ?pp
} =>{ ?class cmw:allParents ?pp}.
in ?x, ?class.
{ ?x a ?class}=>{ ?x cmw:isOfClassType ?class}.
in ?x, ?class.
{ ?x a ?xc. ?xc cmw:allParents ?class}=>{ ?x cmw:isOfClassType ?class}.

An example of use of the ontology is as follows:
:Car a cmw:Class.
:Car cmw:property:color.
:Car cmw:property:name.
:color a cmw:Property
:color cmw:propertyType:Color.
:name a cmw:Property
:name cmw:propertyType xsd:string.
:Color a cmw:Class.
:read a :Color.
:blue a :Color.

Figure 12:
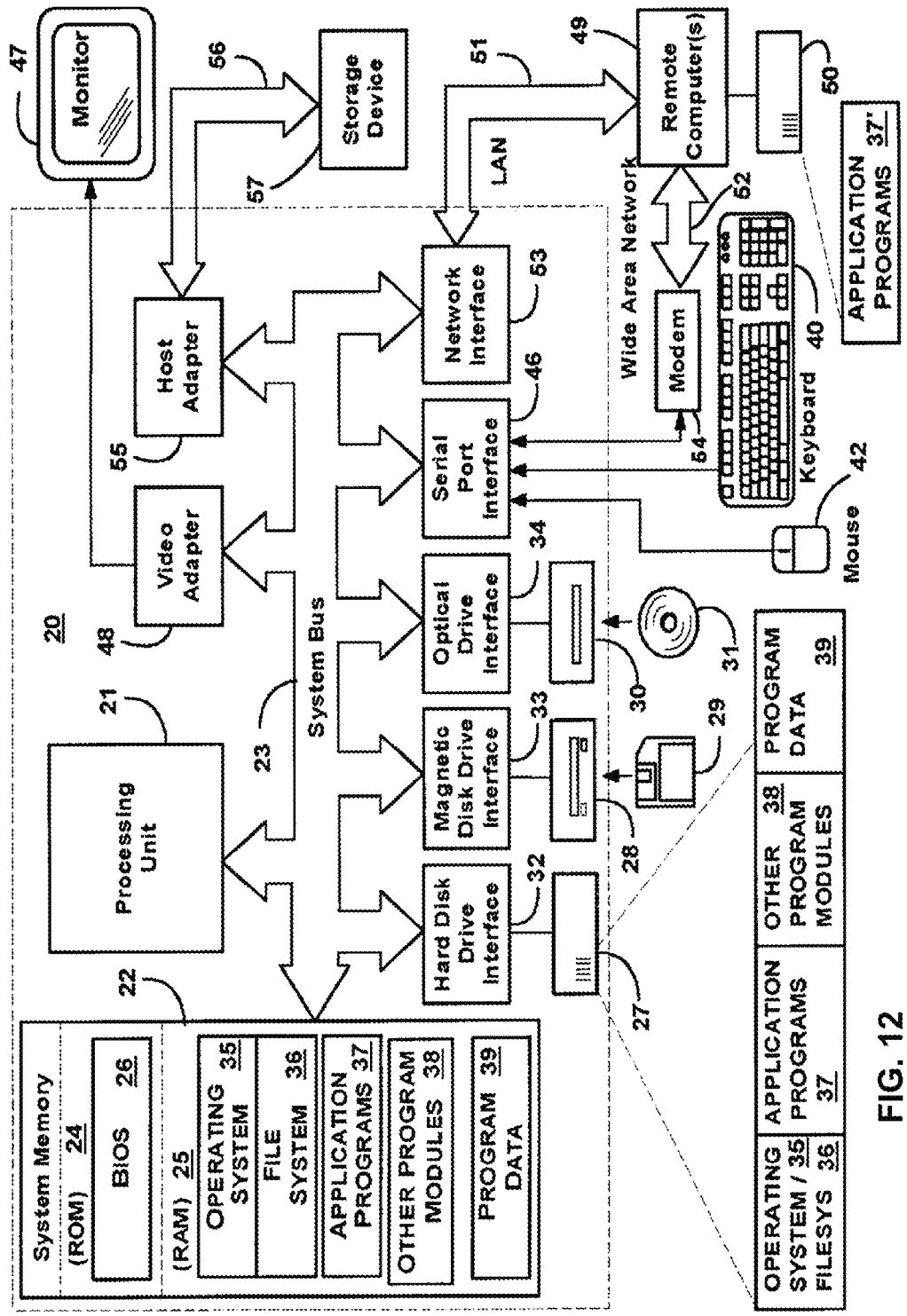
FIG. 12 illustrates a schematic of an exemplary computer system that can be used for implementation of the invention.

With reference to FIG. 12, an exemplary system for implementing the invention includes a general purpose computing (or processing) device 20 or the like, including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory optionally includes read-only memory (ROM) 24 and random access memory (RAM) 25. A basic input/output system 26 (BIOS), containing the basic routines that help transfer information between elements within the device 20, such as during start-up, is stored in ROM 24.

The computing device 20 can optionally include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media.

The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

Although the exemplary environment described herein does not employ a hard disk, a removable magnetic disk 29 and a removable optical disk 31, it should be appreciated by those skilled in the art that these devices can also be used in the exemplary operating environment.

A number of program modules may be stored on the hard disk, magnetic disk 29, optical disk 31, ROM 24 or RAM 25, including an operating system 35. The computing device 20 includes a file system 36 associated with or included within the operating system 35, one or more application programs 37, other program modules 38 and program data 39. A user may enter commands and information into the computing device 20 through input devices such as a keyboard 40 and pointing device 42, but these devices are optional. The exemplary embodiment provides a virtual keyboard and a "touch screen" option for pointing.

These and other input devices are often connected to the processing unit 21 through a serial port interface 46 that is coupled to the system bus, but may be connected by other interfaces, such as a parallel port, game port or universal serial bus (USB). A monitor 47 or other type of display device can be optionally connected to the system bus 23 via an interface, such as a video adapter 48. In the exemplary embodiment, an integrated display is used.

The computing device 20 may operate in a networked environment using logical connections to one or more remote computers 49. The remote computer (or computers) 49 may be another computer, a server, a router, a network PC, a peer device or other common network node, and typically includes many or all of the elements described above relative to the device 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet.

The modem 54, which may be internal or external, is connected to the system bus 23 via the serial port interface 46. In a networked environment, program modules depicted relative to the device 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A system for processing application data, the system comprising:
    a plurality of databases located on one or more hardware storage devices, the plurality of databases storing rules and axioms both represented in SPO (subject-predicate-object) triplet format, the axioms representing facts,
    wherein each application stores its axioms in its own database and has no direct access to other applications' databases;
    a common storage layer that provides access for the applications to the plurality of databases and keeps track of what is stored in which database;
    wherein the common storage layer permits working with the plurality of databases simultaneously and permits access to axioms and rules from the plurality of databases, and acts as a layer of abstraction between the applications and the databases to enable platform-independent access and processing of data in the databases by the applications based on context provided by the applications,
    wherein triples stored in the plurality of databases, when requested by the applications, are represented as a global virtual database that is uniquely represented for each application wherein the global virtual database generates contextualized application related data that is accessible through the common storage layer, without duplicating the triples in a particular context of their corresponding application, by using a rule-based translation mechanism between a dictionary of the corresponding application and a global dictionary; and
    wherein the global dictionary provides an exchange of information between the plurality of databases;
    at least one ontology that represents a particular data interpretation, the ontology stored in an SPO format and based on the rules and axioms;
    a logical layer that
    (i) processes requests to transform one set of SPO triplets defined in terms of ontologies of a first application into a different set of SPO triplets defined in terms of ontologies of a second application, based on the context provided by the first and second applications for specific ontologies, the context representing an environment surrounding a particular event, object or individual that defines an interpretation of the axioms,
    wherein the interpretation is based on which application is accessing the SPO triplets,
    (ii) performs operations on the axioms based on triggers specified by the rules and generating new axioms in the same context, and
    (iii) stores a history of changes of the objects in a dedicated database; and
    a presentation layer that filters the axioms based on connections between the ontologies and the SPO triplets and presents the axioms to a user based on the context.

2. The system of claim 1, wherein the presentation layer filters the data based on enforcing a context on the inputted data.

3. The system of claim 1, wherein the presentation layer filters the data based on enforcing a context on the outputted data.

4. The system of claim 1, wherein the presentation layer interprets the data in its context.

5. The system of claim 1, wherein the logical core adds new ontologies that include new rules.

6. The system of claim 1, wherein the axioms are stored in BTrees.

7. The system of claim 1, wherein the plurality of databases includes an axiom database, an operations history database, and a configuration database with application settings.

8. The system of claim 1, wherein the ontologies are stored in at least one file in N3 format.

9. The system of claim 1, wherein the logical layer caches the results of the processing.

10. The system of claim 1, wherein the plurality of databases comprises:
    a user data database where each user's axioms are stored;
    an operations history database where a history of changes of objects is stored; and
    a configuration database where application settings are stored.

11. A computer-implemented method of processing business data, the method comprising:
    storing rules and axioms both represented in SPO (subject-predicate-object) triplet format in a plurality of databases located on one or more hardware storage devices,
    wherein each application stores its axioms in its own database and has no direct access to other applications' databases;
    providing access to the plurality of databases and keeping track of what is stored in which database, including working with the plurality of databases simultaneously and accessing axioms and rules from the plurality of databases by utilizing a layer of abstraction between the applications and the databases that enables platform-independent access and processing of data in the databases by the applications based on context provided by the applications,
    wherein triples stored in the plurality of databases, when requested by the applications, are represented as a global virtual database that is uniquely represented for each application wherein the global virtual database generates contextualized application related data that is accessible through the common storage layer, without duplicating the triples in a particular context of their corresponding application, by using a rule-based translation mechanism between a dictionary of the corresponding application and a global dictionary, and
wherein the global dictionary provides an exchange of information between the plurality of databases;
storing at least one ontology that represents a particular data interpretation in an SPO format and based on the rules and axioms;
utilizing a logical layer to
(i) process requests to transform one set of SPO triplets defined in terms of ontologies of a first application into a different set of SPO triplets defined in terms of ontologies of a second application, based on the context provided by the first and second applications for specific ontologies, the context representing an environment surrounding a particular event, object or individual that defines an interpretation of the axioms,
wherein the interpretation is based on which application is accessing the SPO triplets,
(i) perform operations on the axioms based on triggers specified by the rules and generating new axioms in the same context, and
(ii) store a history of changes of the objects in a dedicated database; and
filtering the axioms based on connections between the ontologies and the SPO triplets and presenting the axioms to a user based on the context.

12. The method of claim 11, further comprising generating new axioms by representing existing axioms in a new context.

13. The method of claim 11, further comprising adding new ontologies that include existing axioms.

14. The method of claim 11, further comprising adding new ontologies that include new axioms.

15. The method of claim 11, further comprising adding new ontologies that include existing rules.

16. The method of claim 11, further comprising specifying the context for the data that defines which operations can be performed on the data.

17. The method of claim 11, further comprising generation of a data representation for the same data but in a new context.

18. The method of claim 11, wherein the presenting comprises filtering the data based on connections between objects established by the ontologies and the SPO triplets.

19. The method of claim 11, wherein the ontology includes restrictions on the axioms used to validate the data.

20. The method of claim 18, wherein the operations are specified by the user and include a combination of spreadsheet, logical and mathematical operations.

* * * * *